(12) United States Patent
Mehta et al.

(10) Patent No.: US 11,212,870 B2
(45) Date of Patent: Dec. 28, 2021

(54) METHOD AND SYSTEM FOR MANAGING A PRIVATE, DECENTRALIZED, SECURE, IP-BASED PEER-TO-PEER MESH OVERLAY NETWORK

(71) Applicant: ELEAR SOLUTIONS TECH PRIVATE LIMITED, Telangana (IN)

(72) Inventors: Manav Kumar Mehta, Hyderabad (IN); Narendra Kumar Agarwal, Hyderabad (IN)

(73) Assignee: ELEAR SOLUTIONS TECH PRIVATE LIMITED, Telangana (IN)

( * ) Notice: Subject to any disclaimer, the term of this patent is extended or adjusted under 35 U.S.C. 154(b) by 120 days.

(21) Appl. No.: 16/838,769

(22) Filed: Apr. 2, 2020

(65) Prior Publication Data

US 2020/0323030 A1     Oct. 8, 2020

Related U.S. Application Data

(60) Provisional application No. 62/828,005, filed on Apr. 2, 2019.

(51) Int. Cl.
*H04W 84/18* (2009.01)
*H04L 29/06* (2006.01)
(Continued)

(52) U.S. Cl.
CPC ........... *H04W 84/18* (2013.01); *H04L 63/101* (2013.01); *H04L 67/104* (2013.01); *H04W 88/16* (2013.01)

(58) Field of Classification Search
CPC ..... H04W 84/18; H04W 88/16; H04W 88/18; H04L 63/10; H04L 63/101; H04L 63/105;
(Continued)

(56) References Cited

U.S. PATENT DOCUMENTS

| 2009/0138617 A1* | 5/2009 | Veillette | H04W 40/22 709/238 |
| 2013/0136033 A1* | 5/2013 | Patil | H04L 41/145 370/255 |

(Continued)

*Primary Examiner* — Kevin D Mew
(74) *Attorney, Agent, or Firm* — Patterson Thuente Pedersen, P.A.

(57) ABSTRACT

Embodiments of the present disclosure relate to a method and a system for creating and managing a private, decentralized, secure peer-to-peer IP based mesh overlay network. In one embodiment, the mesh network is created comprising at least one gateway node capable of controlling one or more resources connected to the at least one gateway node. A mesh network management server authenticates and provisions the gateway node with a license and firmware for adding to the mesh overlay network and grants ownership of the gateway node to an authorized user. The owner may request for addition or removal of the gateway node or the resources. Each gateway node in the mesh overlay network is configured to share network information of all other gateway nodes, thereby enabling every gateway node to synchronize all of the information of the network, thus creating and managing a mobility resilient, self-healing, plug and play network infrastructure for connecting applications, devices and services for the Internet of Everything (IoE).

41 Claims, 19 Drawing Sheets

(51) Int. Cl.
*H04W 88/16* (2009.01)
*H04L 29/08* (2006.01)

(58) Field of Classification Search
CPC ..... H04L 63/107; H04L 63/12; H04L 67/104; H04L 67/1074; H04L 67/1076; H04L 67/1087
See application file for complete search history.

(56) References Cited

U.S. PATENT DOCUMENTS

| | | | |
|---|---|---|---|
| 2015/0372875 A1* | 12/2015 | Turon | H04W 84/20 370/254 |
| 2016/0259923 A1* | 9/2016 | Papa | H04W 12/08 |
| 2017/0339653 A1* | 11/2017 | Hui | H04L 41/0859 |
| 2018/0139275 A1* | 5/2018 | Abraham | H04W 12/50 |
| 2019/0215673 A1* | 7/2019 | Choi | H04L 47/20 |
| 2020/0322286 A1* | 10/2020 | Mehta | H04L 67/1074 |
| 2021/0282013 A1* | 9/2021 | Jiang | H04W 12/03 |
| 2021/0282223 A1* | 9/2021 | Pei | H04L 63/08 |

\* cited by examiner

METHOD AND SYSTEM FOR MANAGING A PRIVATE, DECENTRALIZED, SECURE, IP-BASED PEER-TO-PEER MESH OVERLAY NETWORK

CROSS-REFERENCE TO RELATED APPLICATION

This application claims the benefit of priority under 35 U.S.C. § 119 to Provisional Patent Application 62/828,005 entitled "Method and System for Creating and Managing a Secure IP-Based Mesh Overlay Peer-to-Peer Network," the contents of which are incorporated by reference herein in their entirety.

TECHNICAL FIELD

The present subject matter is related, in general to field of network management, and more particularly, but not exclusively to a method and a system for creating and managing a private, decentralized, secure, peer-to-peer IP based mesh overlay network, to enable consumer data privacy in the upcoming "Internet of Everything" (IoE) world.

BACKGROUND

With the advent of the 5th Generation of Cellular Connectivity (5G), the world is transitioning from an Internet of Things (IoT) world to an "Internet of Everything" (IoE) world. A world where Devices, Apps and Services are interconnected into a unified and interoperable fabric of networked communication. Low Latency is a mission critical requirement for 5G IoE applications encompassing connected cars, smart homes, drones, consumer wearable devices, virtual reality, augmented reality and industrial devices. Consumers of such systems will see vast amounts of their life getting digitized by this next digital revolution. The simplest of systems, like a diabetic monitor, to extremely complex systems, like an automotive, are transforming into digital platforms that generate vast amounts of insightful consumer data.

Today, to create such a unified and interoperable fabric of communication, IoT system architectures rely on the centralized cloud as the core platform enabler and aggregator of data. "Cloud first" IoT architectures depend on sensors for streaming data to digital twins in the cloud for data aggregation, running rules, making inferences and acting upon the inferences. But given their centralized nature of hoarding data in one place, cloud first architectures are prone to data breaches and privacy concerns. Such cloud-first platforms are additionally unable to provide low latency due to lack of Quality of Service (QoS) on the core internet network adding to an un-predictable round-trip time. Additionally, the cost of bandwidth related to ingress and egress of sending all the data to the cloud is not very scalable for solving use cases at a lower on-going economic cost. And finally, a major vulnerability in cloud first architectures is that if the cloud goes down, the entire IoE network goes down with it. This implies the entire value of the consumers' connected fabric is centralized and under the ownership and control of a single 3rd party entity.

With Moore's law, today's client-side processors and memories at the network edge have achieved significant computing capacity allowing them to get autonomous and without cloud dependency. Further, the transition from 4G to 5G will be focused towards a network transformation which will lead to a computing continuum that scales from on-device, to edge network of devices, to micro-datacentres of edge cloud, to data warehouse, whereby computing workloads can be scheduled in a distributed manner across this network compute continuum. These technological trends can be exploited to overcome the limitations of a cloud first architecture.

There is a thus a need for a method and a system to create and manage a scalable, private by design, decentralized, secure, fully self-owned, peer-to-peer IP based mesh overlay network that enables a mobility resilient, self-healing, plug and play network infrastructure fabric for connecting things, applications, devices and services for the IoE

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

In one embodiment, the present disclosure relates to a method of creating and managing a decentralized IP-based mesh overlay network of one or more nodes. The method comprising steps of receiving a provisioning request from at least one gateway node and upon authentication, provisioning of license and firmware of the at least one gateway node. The method further comprising receiving a request for ownership of the at least one gateway node from the at least one gateway node, wherein the ownership request includes a gateway access token of the at least one gateway node and a user access token associated with the client application. The method furthermore comprising providing ownership rights of the at least one gateway node to the user upon validation of the gateway access token and the user access token and creating the mesh overlay network with the at least one gateway node added to the mesh overlay network upon successful verification of the ownership rights of the at least one gateway node.

In another embodiment, the present disclosure relates to a system for creating and managing a decentralized IP-based mesh overlay network of one or more nodes. The system comprises a mesh network management server that comprises at least a processor, and a memory communicatively coupled to the processor. The memory stores processor-executable instructions, which, on execution, cause the processor to receive a provisioning request from at least one gateway node and provision license and firmware of the at least one gateway node upon authentication of the mesh network management server and the at least one gateway node. The processor further receives a request for ownership of the at least one gateway node from the at least one gateway node, wherein the ownership request includes a gateway access token of the at least one gateway node and a user access token associated with the client application. Furthermore, the processor provides ownership rights of the at least one gateway node to the user upon validation of the gateway access token and the user access token. The processor then creates the mesh overlay network with the at least one gateway node added to the mesh overlay network upon successful verification of the ownership rights of the at least one gateway node.

In yet another embodiment, the present disclosure relates to a method of creating and managing a decentralized IP-based mesh overlay network of one or more nodes. The method comprising transmitting a provisioning request to a mesh network management server and receiving a gateway access token and firmware provisioned in response to authentication of the mesh network management server and the at least one gateway node. The method further comprising transmitting a request for ownership from a client application of the user of the at least one gateway node to the mesh network management server, wherein the request for ownership includes a gateway access token received from the mesh network management server, and a user access token associated with the client application. Upon verification of the gateway access token and the user access token, the method comprising receiving confirmation of ownership rights of the at least one gateway node and adding to one of a new and existing mesh overlay network to create the mesh overlay network based on successful verification of the ownership rights of the at least one gateway node.

In still another embodiment, the present disclosure relates to a system for creating and managing a decentralized IP-based mesh overlay network of one or more nodes. The system comprises at least one gateway node, comprising at least a processor, and a memory communicatively coupled to the processor. The memory stores processor-executable instructions, which, on execution, cause the processor to transmit a provisioning request to a mesh network management server. The processor further receives a gateway access token and firmware provisioned by the mesh network management server in response to authentication of the mesh network management server and the at least one gateway node. The processor then transmits a request for ownership from a client application of the user of the at least one gateway node to the mesh network management server, wherein the request for ownership includes a gateway access token received from the mesh network management server, and a user access token associated with the client application. Upon verification of the gateway access token and the user access token by the mesh network management server, the processor receives confirmation of ownership rights of the at least one gateway node and adds to one of a new and existing mesh overlay network to create the mesh overlay network based on successful verification of the ownership rights of the at least one gateway node.

In another embodiment, the present disclosure relates to a method of creating and managing a decentralized IP-based mesh overlay network of one or more nodes. The method comprising receiving a request for a network management (NM) node for the mesh overlay network from the management server, wherein the request comprises at least network name and network ID of the mesh overlay network. The method further comprising creating the NM node and a gateway node invite for the one of the gateway nodes joining the mesh overlay network and transmitting the gateway node invite to the management server for creating the mesh network and adding the one of gateway nodes to the mesh network.

In a further embodiment, the present disclosure relates to a system for creating and managing a decentralized IP-based mesh overlay network of one or more nodes. The system comprises a relay server, that comprises at least a processor, and a memory communicatively coupled to the processor. The memory stores processor-executable instructions, which, on execution, cause the processor to receive a request for a network management (NM) node for the mesh overlay network from the management server, wherein the request comprises at least network name and network ID of the mesh overlay network. The processor is further configured to create the NM node and a gateway node invite for the one of the gateway nodes joining the mesh overlay network and transmit the gateway node invite to the management server for creating the mesh network and adding the one of gateway nodes to the mesh network.

In yet another embodiment, the present disclosure relates to a method of enabling synchronization of one or more gateway nodes in a mesh overlay network. The method comprising detecting at least one of events including addition/connection/reconnection of a new gateway node to the mesh overlay network, removal of one of the gateway nodes from the mesh overlay network and addition/removal of one or more resources connected to one of the gateway nodes in the mesh overlay network. Further, the method comprising updating one or more of network data and resource data based on at least one event detected, wherein the network data is associated with the one or more gateway nodes of the mesh overlay network, and the resource data is associated with the one or more resources connected to the one or more gateway nodes in the mesh overlay network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the leftmost digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
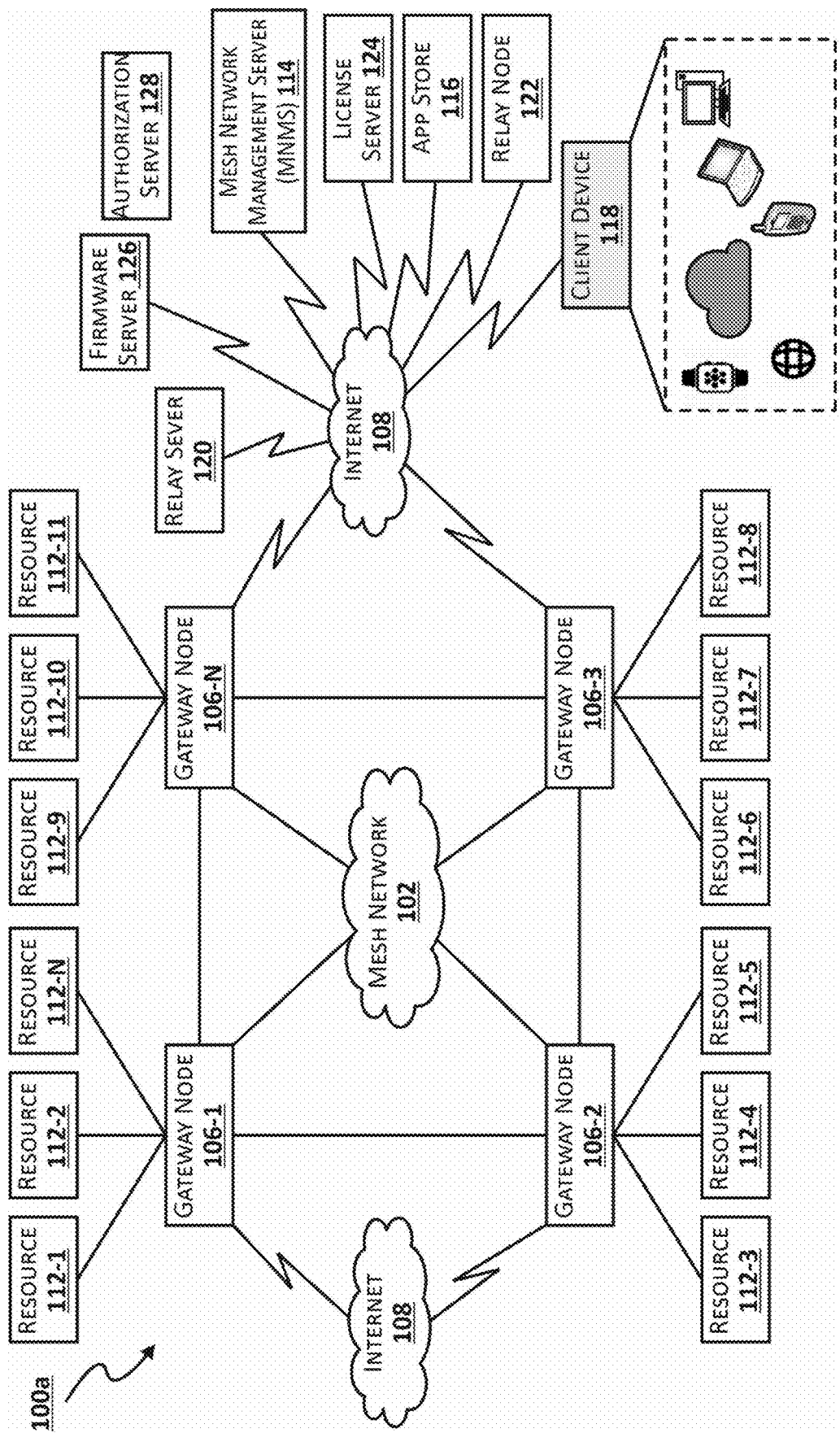
FIG. 1a shows a high-level system architecture of a wireless communication system in accordance with one embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION OF THE DRAWINGS

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", "include(s)", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a system for creating and managing a private, decentralized, secure, peer-to-peer IP based mesh overlay network. The mesh overlay network may be an inter-connected collection of one or more nodes capable of directly connecting to one or more other nodes. In one embodiment, the mesh overlay network is created by comprising at least one gateway node that may be capable of controlling one or more resources connected to the at least one gateway node. A mesh network management server authenticates and provisions the gateway node with a license and firmware for joining to the mesh overlay network upon establishing ownership rights to a user or owner of the gateway node. The owner may request for addition of the gateway node via a client application on the user device. The client application is an end user application enables connection to the mesh overlay network to access one or more resources of the mesh overlay network. The owner may further request for addition and removal of the one or more resources to the gateway node, and removal of gateway node. Each gateway node in the mesh overlay network is configured to share network information of one gateway node with all other gateway nodes, thereby enabling every gateway node to have access to all of the information of the mesh overlay network, thus creating and managing a mobility resilient, self-healing, plug and play network infrastructure for connecting applications, devices and services for the Internet of Everything (IoE).

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a shows a high-level system architecture of a wireless communication system 100a in accordance with one embodiment of the present disclosure.

As illustrated, the exemplary wireless communication system (hereinafter referred to as system) 100a includes one or more components configured to create and manage a decentralized, secure, peer-to-peer IP based mesh overlay network. In one embodiment, the peer-to-peer IP based mesh overlay network (hereinafter referred to as mesh network 102) comprises one or more gateway nodes 106-1, 106-2, . . . 106-N (collectively referred to as gateway nodes 106) directly connected to each other to form the mesh network 102 and further communicatively coupled to Internet 108. Further, each of the gateway nodes 106 may be coupled to one or more resources 112-1, 112-2, . . . 112-N (hereinafter collectively referred to as resources 112) performing one or more functions or actions in response to commands from the gateway nodes 106.

Each of the resources 112 may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. In one example, one of the resources 112 may be an IoE thing that may have a passive communication interface, such as a quick response (QR) code, a radio-frequency identification (RFID) tag, an NFC tag, or the like, or an active communication interface, such as a modem, a transceiver, a transmitter-receiver, or the like. In another example, the resources 112 may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the gateway nodes 106. The resources 112 may also include cell phones, desktop computers, laptop computers, tablet computers, storage devices (networked or wired over USB or PCIe, etc.), printers, fax machines, copiers, personal digital assistants (PDAs), etc. Accordingly, the mesh network 102 may be comprised of a combination of "legacy" Internet-accessible devices (e.g., laptop or desktop computers, cell phones, etc.) in addition to devices that do not typically have Internet-connectivity (e.g., dishwashers, etc.).

In yet another example, the resources 112 may be IoT devices, for example a passive IoT device or an active IoT device. Active IoT devices may detect, store, communicate, act on, and/or the like, changes in attributes of passive IoT devices. Passive IoT devices may include barcoded devices, Bluetooth devices, radio frequency (RF) devices, RFID tagged devices, infrared (IR) devices, NFC tagged devices, or any other suitable device that can provide identifier and attributes to another device when queried over a short-range interface. In another example, the resources 112 may be a service like a network/web service or just a plain old storage medium like hard disk or USB drive.

As illustrated in FIG. 1a, the resources 112 may a door 112-1, a camera 112-2, a telephone 112-3, a light bulb 112-4, a temperature sensor 112-5, a microwave oven 112-6, a temperature sensor 112-7, hard disk 112-8, a meter 112-9 of a vehicle, a lighting unit 112-10, access door 112-11 of the vehicle and so on. Each of the resources 112 may have a unique identifier and a particular set of attributes relating to configuration, state or monitored activities of the resources 112. In one example, the set of attributes may relate to state or status of the resources 112. The state or status may be for example, ON or OFF of the light bulb 112-4, OPEN or CLOSED of the access door 112-11, current temperature setting of the temperature sensors 112-5 and 112-7, AVAILABLE or BUSY of the telephone 112-3, available space of the hard disk 112-8, and so on. Examples of configuration include brightness level to set on the light bulb 112-4, a cooling or heating function, an environmental monitoring or recording function of the temperature sensors 112-5 and 112-7, a light-emitting function of the lighting unit 112-10, a sound-emitting function, etc. that can be embedded in and/or controlled/monitored by a central processing unit (CPU), microprocessor, ASIC, or the like, and configured for connection to an IoT network such as a local ad-hoc network or the Internet 108. Example of monitored activities include access logs on the door 112-1, historical meter readings on the meter 112-9, and so on.

The resources 112 make up a resource sub-network. The resource sub-network is a group of resources 112 connected to each gateway node 106 using either Wired protocols [PCI, PCIe, USB, CAN, I2C, SPI, UART, RS-485, RS-232, Ethernet, Modbus, KNX, etc.] or Wireless [Zigbee, Bluetooth, Z-wave, Wi Fi, BLE, 2G (GPRS/EDGE), 3G (HSPA, HSDPA, HSUPA), 4G (LTE, NB-IoT), 5G (mm-Wave, sub-6 Ghz), etc.] protocol standards. In one embodiment, some of the gateway node 106 are capable of interfacing with multiple sub-network wired and/or wireless protocols simultaneously. For example, as illustrated in FIG. 1a, the resources 112-1, 112-2 form a first resource sub-network connected to the gateway node 106-1. In one example, a washing machine may be the gateway node 106-1, then the washing machine may be capable of interfacing with Zigbee protocol resource such as Light bulb 112-4, with Z-Wave protocol resource such as a relay, or with a wired protocol resource such as sensor wired directly to the gateway node 106-1 to gather diagnostic information. In another example, the resources 112-3, 112-4, and 112-5 form a second resource sub-network connected to the gateway node 106-2. In yet another example, the resources 112-6 and 112-7 form a third resource sub-network connected to the gateway node 106-3. In still another example, the resources 112-8, 112-9 and 112-10 form a fourth resource sub-network connected to the gateway node 106-N. These multiple resources sub-network may be connected to and communicate with the gateway nodes 106 in the mesh network 102 using wired or wireless communication protocols. In another embodiment, some of the gateway nodes will only be capable of interfacing one single sub-network wired or wireless protocol.

Each of the gateway nodes 106 may be for example, an IoE gateway or controller that is configured to observe, monitor, control and manage various actions of the connected IoE devices. For example, each of the gateway nodes 106 can communicate with the mesh network 102 over a direct wired/wireless connection to monitor or manage attributes, activities, or other states associated with the resources 112 in the wireless communications system 100a. The gateway nodes 106 may also be communicatively coupled to the Internet 108 over a wired or wireless connection and may obtain information from the Internet 108 that can be used to further monitor or manage attributes, activities, or other states associated with the resources 112. In one embodiment, each gateway node 106 may be a standalone device or one of the resources 112, capable of monitoring or controlling other resources 112 connected to the gateway nodes 106. For example, the gateway node 106-1 i.e., washing machine in FIG. 1a, provide functionalities such as controlling the wash or dry cycle, and in addition to controlling connected resources such as camera 112-2 and light bulb 112-4. The gateway nodes 106 may include a physical device or an integrated software application running on a physical device. The gateway nodes 106 may include a user interface that can output information relating to the monitored attributes, activities, or other states associated with the resources 112 and receive input information to control or otherwise manage the attributes, activities, or other states associated therewith. In one aspect, each of the gateway nodes 106 may be directly coupled to the resources via wired network. In another embodiment, each of the gateway nodes 106 may be connected to the resources 112 via short-range radio wireless communication networks such as Bluetooth, ZigBee and Infrared Transmission. Accordingly, the gateway nodes 106 may generally include various components and support various wired and wireless communication interfaces to observe, monitor, control, or otherwise manage the various components in the system 100a.

The system 100a comprises a mesh network management server (hereinafter referred to as management server) 114, and an app store (interchangeably referred to as app repository) 116 coupled to the gateway nodes 106 via the Internet 108. In one embodiment, the app repository 116 stores at least one master application (hereinafter referred to as Master App) that provides standardized features such as network management and control of common resources such as light bulbs. The app repository 116 also stores one or more third-party applications (hereinafter referred to as Third-Party Apps) in the app repository 116 that may provide either alternative implementations of the standardized features or custom implementations of specialized IoE applications, for example, remote video monitoring, management of heating/cooling systems in a building, monitoring of wearable medical devices and so on.

The app repository 116 may comprise one or more client applications that may be configured on at least one user device or the client device 118 enabling access to the gateway nodes 106 and the resources 112 via the mesh network 102. The client device 118 may be a portable electronic device such as a mobile phone, a smart phone, smart watch, smart glass, a gaming device, a music player, a notebook or a desktop computer, or a personal digital assistant, or a server running on the cloud for example. In addition, as is known in the art, the client device 118 can include multiple features or applications such as a camera, a music player, or an Internet browser. The client device 118 comprises the one or more client applications (hereinafter referred to as client application) to connect with the mesh network 102 for accessing the resources 112 in the mesh network 102.

The system 100a further comprises components that enable creation of the mesh network 102, for example, a relay server 120, a relay node 122, a license server 124, a firmware server 126 and an authorization server 128 coupled to the Internet 108. Each of the management server 114, the relay server 120, the relay node 122, the license server 124, the firmware server 126, and the authorization server 128 may be implemented as a plurality of structurally separate servers, or alternately may correspond to a single server connected via the Internet 108. The Internet 108 includes a number of routing agents and processing agents (not shown in FIG. 1a). The Internet 108 is a global system of interconnected computers and computer networks that uses a standard Internet protocol suite (e.g., the Transmission Control Protocol (TCP)/IP or User Datagram Protocol (UDP)/IP to communicate among disparate devices/networks. TCP/IP provides end-to-end connectivity specifying how data should be formatted, addressed, transmitted, routed and received at the destination.

The management server 114 is capable of validating and granting permission to a requesting entity based on the authorizations, permissions allocated to the entities. Entities may be for example, the gateway nodes 106, the client device 118, and one or more client applications requesting access to the resources 112. In one embodiment, the management server 114 receives a request from one of the gateway nodes 106 for joining the mesh network 102. The gateway nodes 106 may request joining of the mesh network 102 via client application configured on the client device 118. The management server 114 provisions the license and firmware of the requesting gateway node before adding the gateway node to the mesh network 102. The license server 124 validates and grants licenses to the requesting gateway nodes 106 and the client application. The firmware server 126 is capable of hosting firmware information that can be queried and downloaded by the gateway nodes 106 depending on the manufacturer, model, current firmware version, etc., of the gateway nodes 106 upon successful validation and grant of license by the license server 124.

If the mesh network 102 is not yet created, the management server 114 enables creation of a new mesh network 102 and adds the requesting gateway node to the mesh network 102. In another aspect, if the mesh network 102 already exists, the management server 114 merely adds the requesting gateway node to the mesh network 102. In one embodiment, the management server 114 also enables addition of one or more resources 112 to each of the gateway nodes 106 and sharing of resource data of each gateway node with all gateway nodes 106. The relay server 120 may be configured to enable creation, management and removal of the relay node that assists to establish direct connection between peers such as the client device 118 and the gateway nodes 106, if the peers are unable to establish a direct connection between them. The relay server 120 also enables the creation of mesh overlay network 102 by provisioning the nodes in the mesh network 102 such as the client app node, the client app proxy node and the gateway node.

Figure 1B:
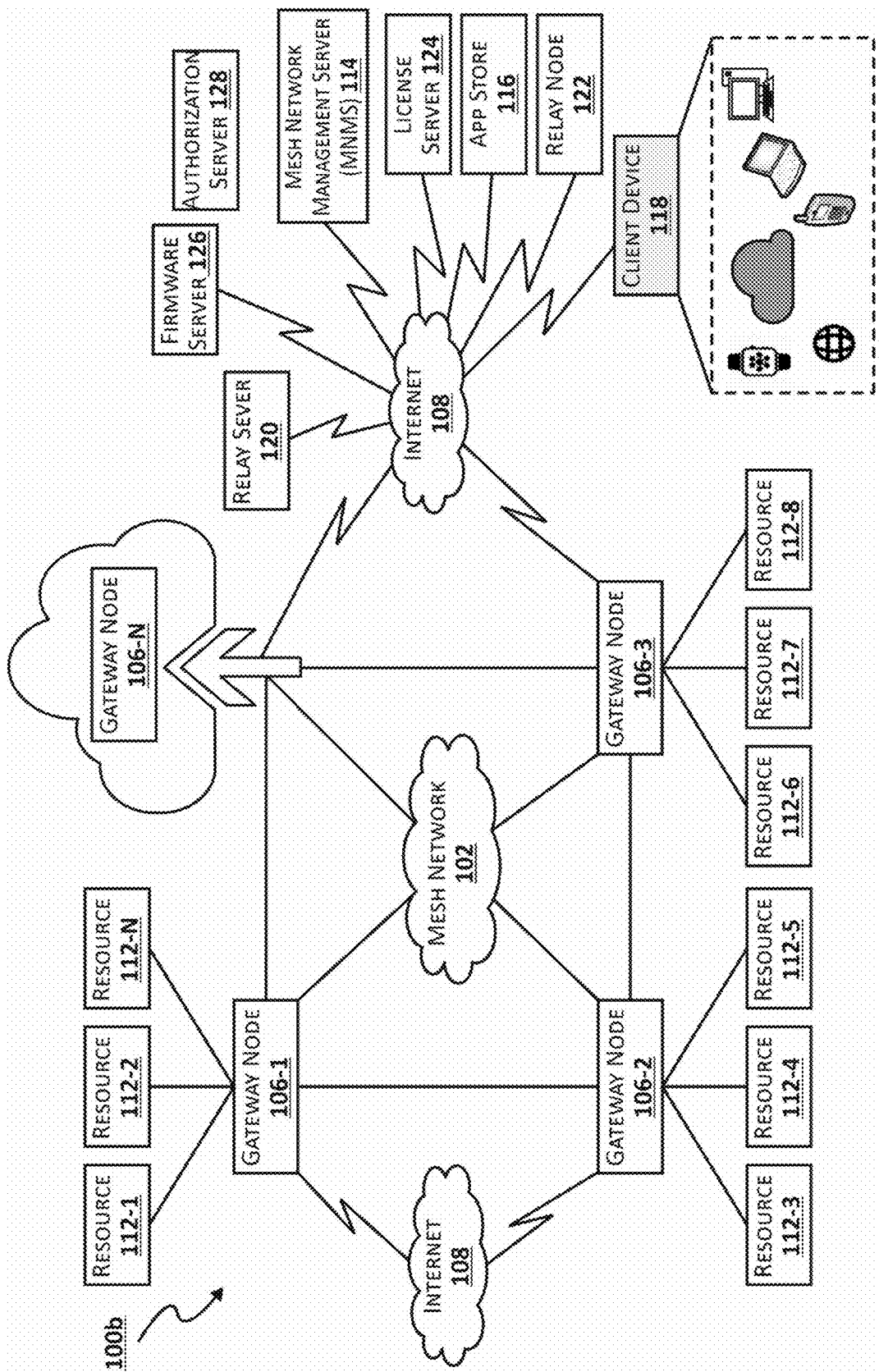
FIG. 1b shows a high-level system architecture of a wireless communication system in accordance with another embodiment of the present disclosure.
Figure 1C:
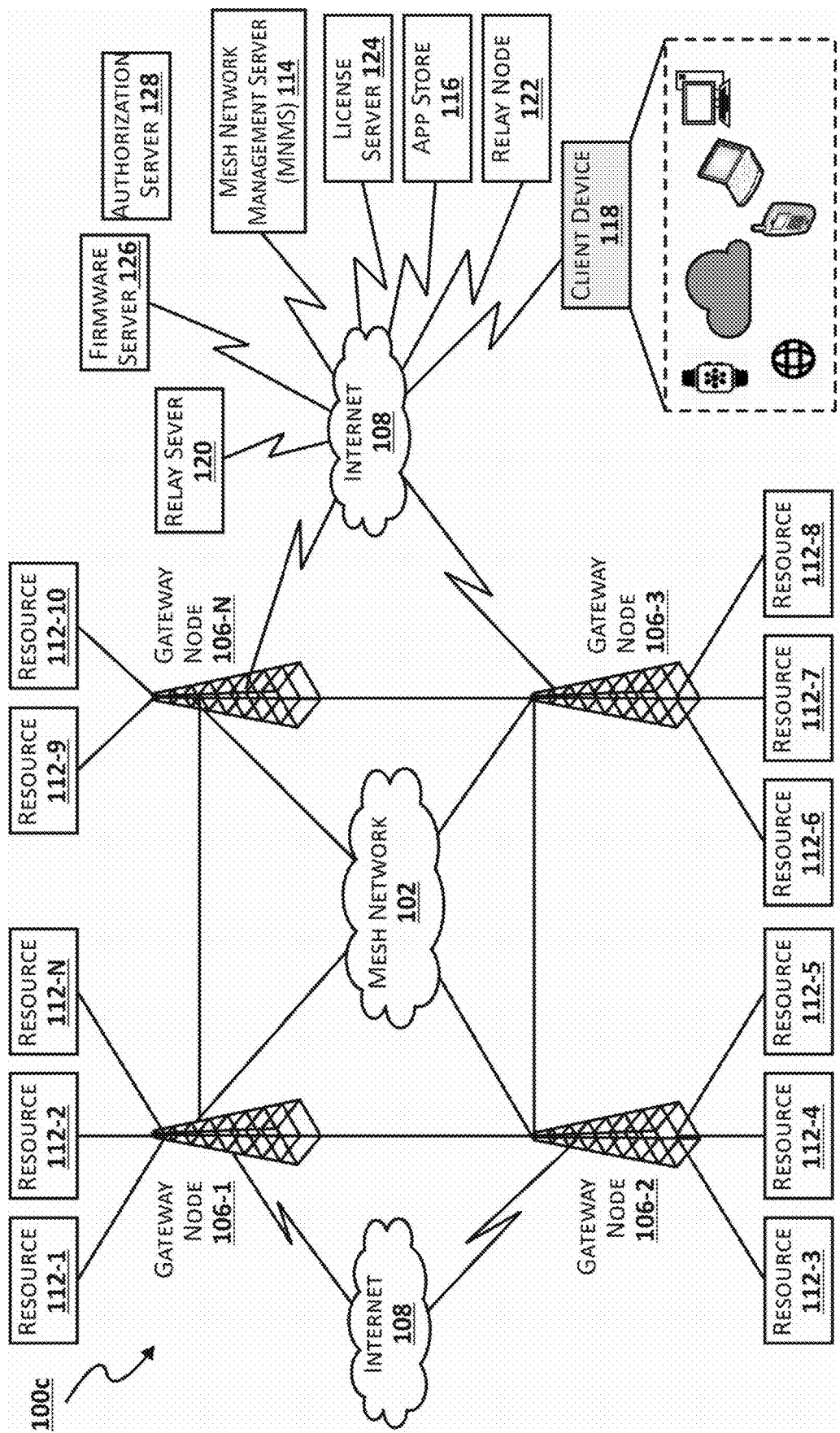
FIG. 1c shows a high-level system architecture of a wireless communication system in accordance with yet another embodiment of the present disclosure.
Figure 1D:
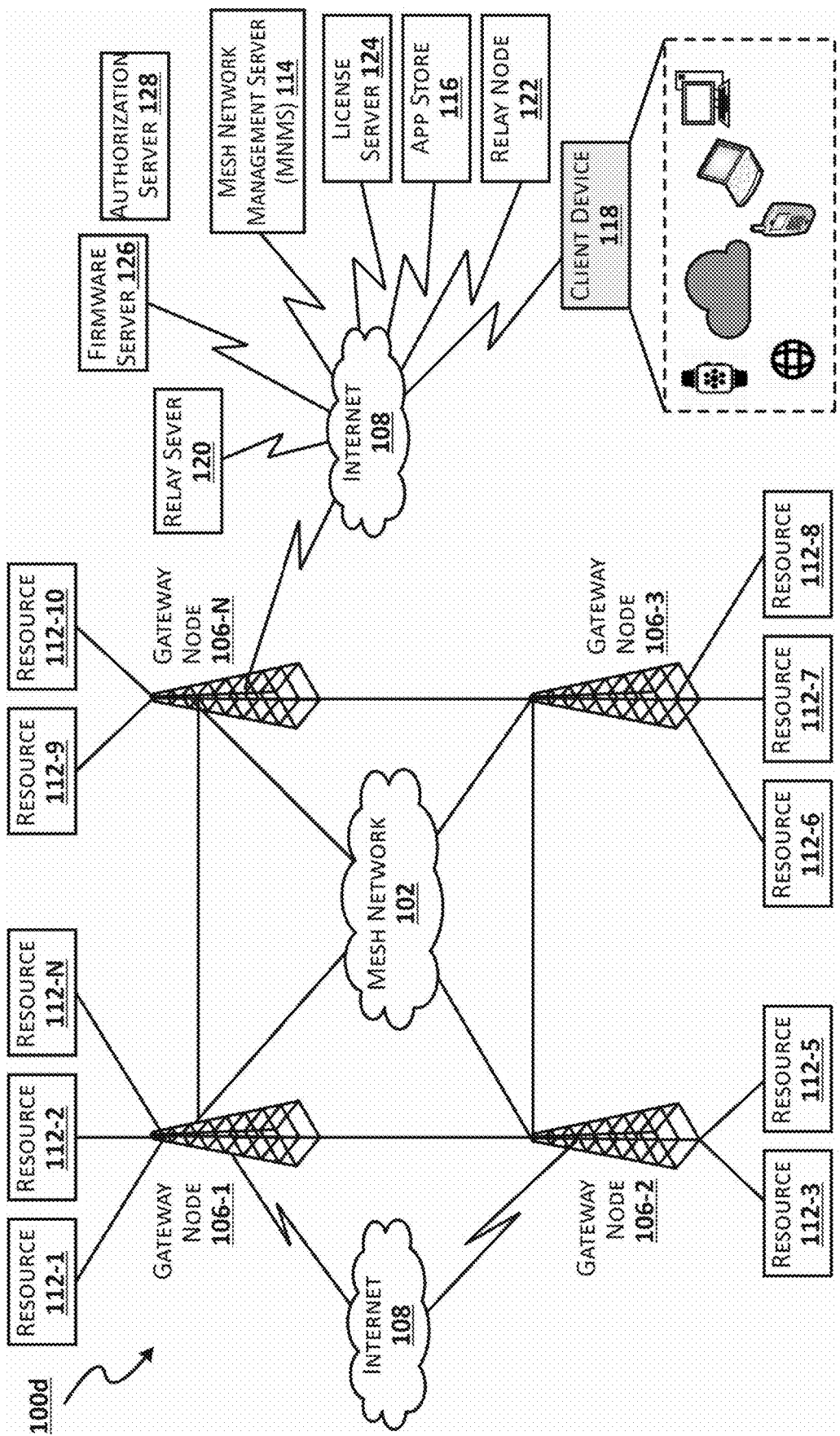
FIG. 1d shows a high-level system architecture of a wireless communication system in accordance with yet another embodiment of the present disclosure.

As such, for brevity and ease of description, various details relating to certain components in the wireless communication systems 100b, 100c and 100d as shown in FIG. 1b, FIG. 1c and FIG. 1d respectively, may be omitted herein to the extent that the same or similar details have already been provided above in relation to the wireless communication system 100a as illustrated in FIG. 1a.

Referring to FIG. 1b, the wireless communication system 100b may include the mesh network 102 comprising the gateway nodes 106 and the resources 112. As illustrated, the gateway node 106-N may be a cloud service controlling the resources 112 in the mesh network 102. The gateway node 106-N may be coupled to the Internet 108 to control the resources 112 in the mesh network 102.

Referring to FIG. 1c, the wireless communication system 100c may be a cellular communication system that includes long range radio devices acting as gateway nodes 106 in the mesh network 102. All the gateway nodes 106 are connected to the Internet 108 in FIG. 1c. Referring to FIG. 1d, the wireless communication system 100d may be a cellular communication system that includes long range devices in the mesh network 102 wherein only few gateway nodes 106 are connected to the Internet 108.

As illustrated in FIG. 1c and FIG. 1d, each of the gateway nodes 106 may be a long-range radio device for example, a base station capable of transmitting and receiving communication signals to and from the resources 112 i.e., one or more mobile stations. Each of the resources 112 may also be a long-range radio device for example, a mobile station capable of receiving and transmitting communication signals from and to the gateway nodes 106 i.e., the one or more base stations. The resources 112 may be for example, a transmitter, a receiver, a modem, a transceiver, a smart phone and other long-range radio devices.

Figure 2A:
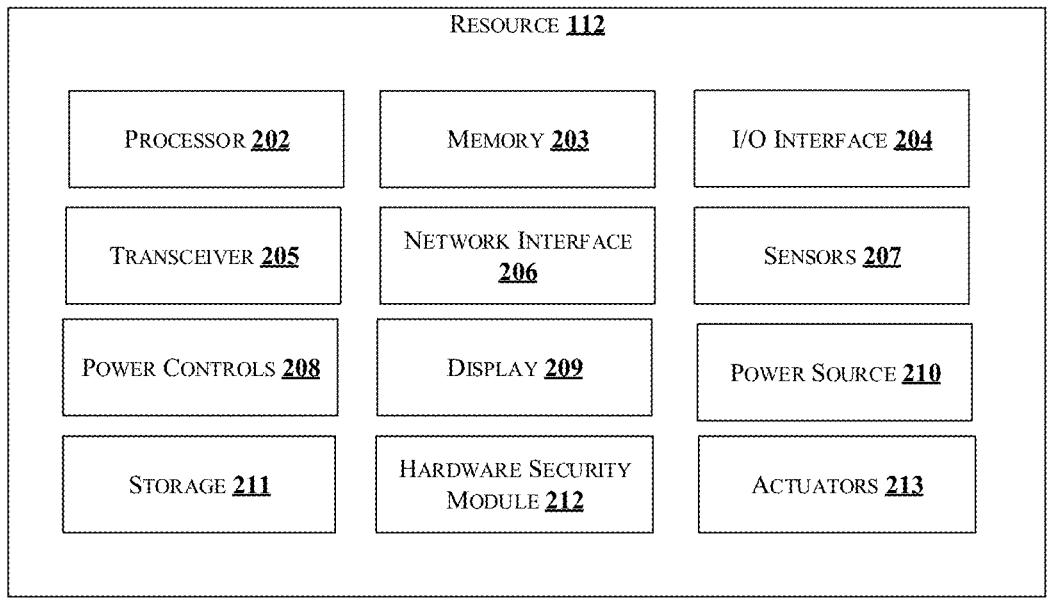
FIG. 2a illustrates an exemplary block diagram of a resource in accordance with some embodiments of the present disclosure.

FIG. 2a illustrates an exemplary block diagram of one of the resources 112 in accordance with some embodiments of the present disclosure. While external appearances and/or internal components can differ significantly among resources 112, most of the resources 112 will have user interface, which may comprise a display and a means for user input. The resources 112 without a user interface can be communicated with remotely over a wired or wireless network. In one embodiment, each of the resources 112 comprises at least a processor 202, at least one memory 203, an I/O interface 204, a transceiver 205, at least one network interface 206, one or more sensors 207, power controls 208, a display 209, power source 210, a storage 211, a hardware security module (HSM) 212 and one or more actuators 213.

The processor 202 may include one or more processors such as microcontroller, microprocessor, application specific integrated circuit (ASIC), digital signal processor (DSP), programmable logic circuit (PLC), or other data processing device, which will be generally referred to as processor 202. The processor 202 can execute application programming instructions stored within the memory 203 of the resources 112. The memory 203 can include one or more of read-only memory (ROM), random-access memory (RAM), electrically erasable programmable ROM (EEPROM), or any memory common to computer platforms. The storage 211 can include one or more of Flash cards, Hard Disks and Solid-State Drives or any persistent storage media. The I/O interface 204 is coupled with the processor 202 and an I/O device. The transceiver 205 may comprise one or more external antennas or one or more integrated antennas that are not limited to Wi-Fi antennas, cellular antennas, satellite position systems (SPS) antennas (for example Global Positioning System (GPS) antennas) and so on. The I/O device is configured to allow the processor 202 to communicate with and control from various I/O devices such as the display 209, the power controls 208, the transceiver 205, the sensors 207, the actuators 213 and other devices associated with the resources 112. The I/O device is configured to receive inputs via the I/O interface 204 and transmit outputs for displaying through the display 209 in the I/O device via the I/O interface 204. In one embodiment, the I/O interface 204 is used by the gateway nodes 106 to connect to the resources 112 directly using UART, SPI, PCIe, or other such well known connectors. The display 209 may be a touchscreen display powered by the power source 210 and the power controls 208 may control the supply of the power from the power source 210 to the other components of the resources 112. In one example, the power source 210 may be A/c power supply or battery.

The processor 202 is configured to receive and/or transmit information using the transceiver 205 that may be a wireless communication interface such as Wi-Fi, Long-Term Evolution (LTE) Direct, etc. In another embodiment, the processor 202 is configured to receive and/or transmit information that includes sensory or hardware measurement provided by the sensors 207 so as to enable the resources 112 to monitor the local environment. The processor 202 is also configured to transmit signal to the actuators 213 which convert the received signal into a corresponding energy to drive a mechanism controlling physical movement in the resources 112 for example, like switching on a light bulb 112-4. The processor 202 may store the monitored information in the storage 211. Furthermore, the processor 202 is configured to execute instructions so as to control the respective hardware elements to perform respective functions. The network interface 206 enables connection of the resources 112 with the gateway nodes 106 nodes via wired or wireless communication protocols. The HSM 212 provides a tamper-proof, highly available secure enclosure to perform a variety of cryptographic operations such as key management, key exchange, encryption etc., to enable strong authentication and a secure means of storing data on the resources 112 and exchanging data with other devices in the mesh network 102.

As will be appreciated by those skilled in the art, the various logic elements can be embodied in discrete elements, software modules executed on a processor (e.g., processor 202) or any combination of software and hardware to achieve the functionality disclosed herein. For example, the transceiver 205, the processor 202, the memory 203, the I/O interface 204 and the storage 211 may all be used cooperatively to load, store and execute the various functions disclosed herein and thus the logic to perform these functions may be distributed over various elements. Alternatively, the functionality could be incorporated into one discrete component. Therefore, the features of the resources 112 in FIG. 2a are to be considered merely illustrative and the disclosure is not limited to the illustrated features or arrangement.

In one example, one of the resources 112 may be a light bulb 112-4 with a unique identifier. The light bulb may comprise multiple endpoints. An example of multiple endpoints is a panel of switches that comprises relays. Each switch on the panel is an endpoint which may be connected to a thin light bulb (a light bulb without any processing capability). The relay can be controlled through software to control the ON/OFF state of the light bulb connected to each switch. Each switch having a capability of powering ON/OFF and level controlling features. The switches may comprise the actuators 213 linked to the microprocessor inside the light bulb 112-4. The actuators 213 directly controls the ON/OFF state of the light bulb 112-4 without the physical switch being flipped, and the actuators 213 can be directly triggered by the processor 202. The actuators 213 may also control the luminescence of the light bulb 112-4 when directly triggered by the processor 202. The processor 202 may monitor the state of the light bulb 112-4 comprising ON/OFF status, current luminescence level and store the monitored state information in the storage 211. The display 209 may display the current state information of the light bulb 112-4. The switch panel may be powered by the power source 210 controlled by the power controls 208. The transceiver 205 may transmit the stored state information to a remote device such as gateway nodes 106 for further processing.

Figure 2B:
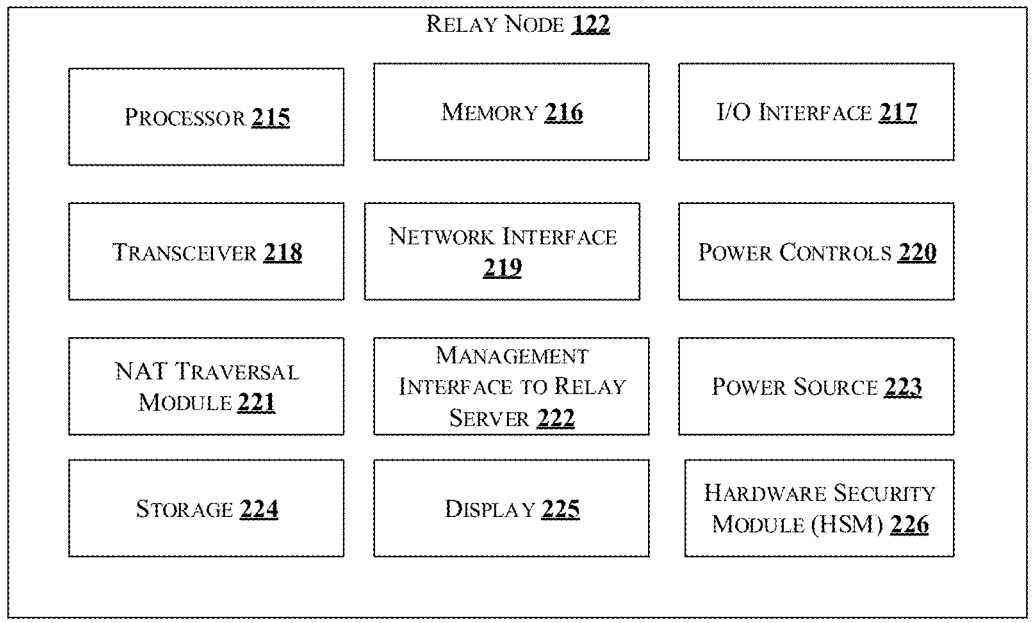
FIG. 2b illustrate an exemplary block diagram of a relay node in accordance with some embodiments of the present disclosure.

FIG. 2b illustrate an exemplary block diagram of the relay node 122 in accordance with some embodiments of the present disclosure.

The relay node 122 may be a node in the mesh network 102 capable of enabling peer-to-peer connection between a client application on the client device 118 and each of the gateway nodes 106 to enable the client application to access the resources 112 connected with the each of the gateway nodes 106. In one embodiment, the relay node 122 is a mesh node having a well-known/static domain name and capable of enabling peer-to-peer connection using UDP hole punching to exchange information between the client device 118 and the one or more gateway nodes 106 using Network Address Translation (NAT) traversal technique. The relay node 122 exchanges dynamic IP addresses of the client device 118 and the one or more gateway nodes 106 in the mesh network 102 to establish the peer-to-peer connection between the client device 118 and the one or more gateway nodes 106. In another embodiment, if the peer-to-peer connection is not established, the relay node 122 creates a tunnel connection between the client device 118 and the one or more gateway nodes 106 in the mesh network 102. In one embodiment, the relay node 122 facilitates TCP tunnelling between the client device 118 and the one or more gateway nodes 106 to establish the peer-to-peer connection.

The relay node 122 may be a typical mesh node as illustrated in FIG. 2b. In one embodiment, the relay node 122 comprises at least a processor 215, a memory 216, an I/O interface 217, a transceiver 218, network interface 219, power controls 220, NAT traversal module 221, management interface to relay server 222, power source 223, storage 224, display 225 and Hardware security module (HSM) 226. The processor 215 may include one or more processors, microcontroller, microprocessor, application specific integrated circuit, digital signal processor (DSP), programmable logic circuit, or other data processing device, which will be generally referred to as processor 215. The processor 215 can execute application programming instructions stored within the memory 216 of the relay node 122. The memory 216 can include one or more of read-only memory (ROM), random-access memory (RAM), electrically erasable programmable ROM (EEPROM), or any memory common to computer platforms. The storage 224 can include one or more of Flash cards, Hard Disks and Solid-State Drives or any persistent storage media. The I/O interface 217 is coupled with the processor 215 and an I/O device.

The I/O device is configured to receive inputs via the I/O interface 217 and transmit outputs for displaying in the I/O device via the I/O interface 217. The transceiver 218 may comprise one or more external antennas or one or more integrated antennas that are not limited to Wi-Fi antennas, cellular antennas, satellite position systems (SPS) antennas (for example Global Positioning System (GPS) antennas) and so on. The I/O device is configured to allow the processor 215 to communicate with and control from various I/O devices such as the display 225, the power controls 220, the transceiver 218 and other devices associated with the relay node 122. The I/O device is configured to receive inputs via the I/O interface 217 and transmit outputs for displaying through the display 225 in the I/O device via the I/O interface 217. In one embodiment, the I/O interface 217 is used by the gateway nodes 106 to connect to the relay node 122 directly using UART, SPI, PCIe, or other such well known connectors. The display 225 may be a touchscreen display powered by the power source 223 and the power controls 220 may control the supply of the power from the power source 223 to the other components of the relay node 122. The power source 223 may be for example, AC power supply or battery.

The network interface 219 enables connection of the relay node 122 with the gateway nodes 106 and the client device 118 via wired or wireless communication protocols. The HSM 226 performs a variety of cryptographic operations such as key management, key exchange, encryption etc., to enable strong authentication and secure means of exchanging data with other devices in the mesh network 102.

The NAT traversal module 221 determines an optimal route between the client device 118 and the one or more gateway nodes 106 to which the one or more resources 112 is connected with and enables tunnelling the traffic from the client device 118 to the gateway nodes 106 through the optimal route. The processor 215 stores the one or more optimal routes determined by the NAT traversal module 221 in the storage 224. The management interface to the relay server 222 enables the relay node 122 to interact with the relay server 120.

As will be appreciated by those skilled in the art, the various elements can be embodied in discrete elements, software modules executed on a processor (e.g., processor 215) or any combination of software and hardware to achieve the functionality disclosed herein. For example, the transceiver 218, the processor 215, the memory 216, the I/O interface 217 and the storage 224 may all be used cooperatively to load, store and execute the various functions disclosed herein and thus the logic to perform these functions may be distributed over various elements. Alternatively, the functionality could be incorporated into one discrete component. Therefore, the features of the relay node 122 in FIG. 2b are to be considered merely illustrative and the disclosure is not limited to the illustrated features or arrangement.

Figure 2C:
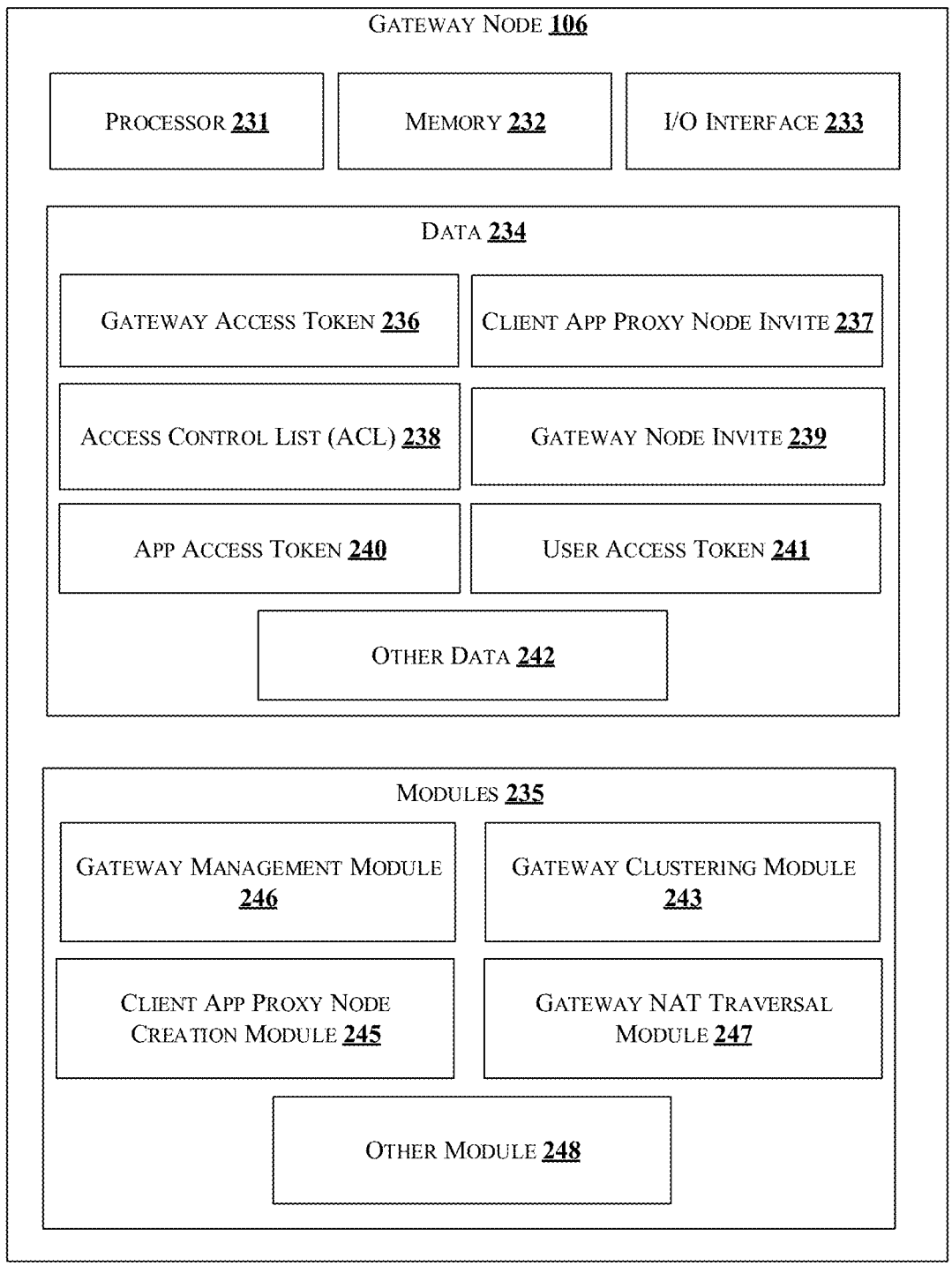
FIG. 2c illustrate an exemplary block diagram of a gateway node in accordance with some embodiments of the present disclosure.

FIG. 2c illustrates an exemplary block diagram of one of the gateway nodes 106 in accordance with some embodiments of the present disclosure;

Each of the gateway nodes 106 control one or more of the resources 112 in the mesh network 102. In one embodiment, each of the gateway nodes 106 receive resource information updates from the resources 112 connected to each of the gateway nodes 106 and control the resources 112 based on the received resource information updates. Each of the resources 112 consider each of the gateway nodes 106 as peer and transmit the resource information updates including attribute information to each of the gateway nodes 106. In one example, as illustrated in FIG. 1a, the resource 112-4 considers the gateway node 106-2 connected to the resource 112-4 as peer and provides the state information to the gateway node 106-2. The resources 112 connect to the gateway nodes 106 using well known interfaces like wired/wireless interfaces, protocols and web services.

Each of the gateway nodes 106 may be typical controller as illustrated in FIG. 2c. Each of the gateway nodes 106 comprise at least a processor 231, a memory 232, and an I/O interface 233. The I/O interface 233 is coupled with the processor 231 and an I/O device (not shown). The I/O device is conFIG.d to receive inputs via the I/O interface 233 and transmit outputs for displaying in display (not shown) of the I/O device via the I/O interface 233. Further, each of the gateway nodes 106 may comprise additional components (not shown) such as a transceiver, a network interface, power controls, power source, storage and Hardware security module (HSM). The network interface enables connection of the resources 112 with the gateway nodes 106 via wired or wireless communication protocols. The network interface also enables the communication between the gateway nodes 106 and the relay server 120. The network interface further enables the communication between the gateway nodes 106 and the management server 114. The HSM performs a variety of cryptographic operations such as key management, key exchange, encryption etc., to enable strong authentication and secure means of exchanging data with other devices in the mesh network 102.

Each of the gateway nodes 106 further comprises data 234 and modules 235. In one implementation, the data 234 and the modules 235 may be stored within the memory 232. In one example, the data 234 may include at least one gateway access token 236, client app proxy node invite 237, access control list (ACL) 238, gateway node invite 239, app access token 240, user access token 241 and other data 242.

The "access token" is, for example, a cryptographic block of data that can only be created or modified by an authorized entity for verification. By using the access token, it can be verified that the token was created only by the authorized entity and never modified after creation. A client device can perform self-authentication purely by virtue of possessing the access token, since it can be verified that the authorized entity created the token and that the token was not modified after creation. The access token is created using a cryptographic private key (which is only possessed by the authorized entity creating the tokens) and verified by means of a cryptographic public key (which may be distributed to whomsoever needs to verify the token). The private key and public key are a pair that function together.

In one embodiment, the gateway access token 236 may be an access token generated by the management server 114 to be used by a specific gateway node for authenticating the specific gateway node to the management server 114. The app access token 240 may be an access token generated by the authorization server 128 to be used by a specific client app for authenticating the specific client app to the authorization server 128 or the management server 114. The app access token 240 is generated by the authorization server 128 to self-authenticate a specific client application to the gateway nodes 106 during when a user of the specific client application requests for ownership of the gateway nodes 106. The authorization server 128 shares the cryptographic public key that may be used by the management server 114 to verify the access token. The user access token 241 may be an access token generated by the authorization server 128 to be used by a specific client app for authenticating the user logged on the client app to the management server 114.

The client app proxy node invite 237 is an invite generated by the relay node 122 for a client app proxy node on the gateway nodes 106 to join the mesh network 102. After successful ownership of the gateway nodes 106, the gateway nodes 106 may join the mesh network 102 using the gateway node invite 239. The gateway node invite 239 is an invite generated by a network management node for each of the gateway nodes 106 to join the mesh network 102. The network management node is a node in the mesh network 102 that manages the gateway nodes 106 of the same mesh network 102. The mesh network 102 may be for example, device mesh network that is an inter-connection collection of one or more nodes including gateway nodes 106 and the network management node that manages the gateway nodes 106. Each of the gateway nodes 106 may communicate with the client application on the client device 118 using an intermediary client app proxy node that serves as a connecting node between a client app node and the gateway nodes 106. The client app node is an instance of the client application created in the mesh network 102 to serve as connecting node between the client application and client app proxy node. The client app proxy node joins the mesh network 102, during addition of the gateway nodes 106 to the mesh network 102, using the client app proxy node invite 237 generated by the relay server 120.

In an embodiment, the mesh network 102 may be a client app mesh network, wherein the client app proxy node joins during addition of the gateway nodes 106. The client app mesh network (not shown) is an inter-connected collection of nodes including client app node, one client app proxy node for each of the gateway nodes 106 and the relay node 122. The client app proxy node enables the client app node of the client application to connect with specific gateway node of the gateway nodes 106 to access the resources 112 connected with the specific gateway node. The specific gateway node allows the client app node of the client application to access the resources 112 connected with the specific gateway node based on the ACL 238 corresponding to the client application.

The ACL 238 is a list of specific permissions to capabilities of each of the endpoints of the resources 112 that are granted to the client application. Each endpoint is provided with a list of capabilities that the client application is permitted to access. Each client application is granted with at least one ACL 238. Based on the specific permissions granted in the ACL 238, the gateway nodes 106 allow the client application to access the resources 112 connected to the gateway nodes 106. For example, if the resource 112 is a switch panel having three endpoints representing switches which as labelled as "A", "B" and "C". Each switch may have ON/OFF capability and a level control capability. The ACL 238 for the client application may comprise ON/OFF capability to the endpoint A, and ON/OFF capability as well as level control capability to the endpoint B. The gateway nodes 106 will not allow the client application to access the level control capability in endpoint A or any capability of endpoint C that are not granted to the client application.

In one embodiment, the data 234 may be stored in the memory 232 in the form of various data structures. Additionally, the aforementioned data can be organized using data models, such as relational or hierarchical data models. The other data 242 may also be referred to as reference repository for storing reference data and data used during the functions of the gateway nodes 106. The other data 242 may also store data, including temporary data and temporary files, generated by the modules 235 for performing the various functions of the gateway nodes 106.

The modules 235 may include, for example, a gateway clustering module 243, a client app proxy node creation module 245, a gateway management module 246, and a gateway NAT traversal module 247. In one embodiment, the gateway management module 246 enables provisioning and ownership of the gateway nodes 106. The gateway clustering module 243 synchronizes updates of shared information at one gateway node with all other gateway nodes. Shared information includes for example, commands, command execution status, resource lists, resource state information and the ACL 238. The client app proxy node creation module 245 enables creation of the intermediary client app proxy node that serves as a connecting node between the client app node and the gateway nodes 106 during addition of the gateway nodes 106 to the mesh network 102. The gateway NAT traversal module 247 determines an optimal route between the client device 118 and the one or more gateway nodes 106 to which the one or more resources 112 is connected with and enables tunneling the traffic from the client device 118 to the resources 112 through the optimal route. The processor 231 stores the one or more optimal routes determined by the gateway NAT traversal module 247 in the storage (not shown).

The modules 235 may also comprise other modules 248 to perform various miscellaneous functionalities of the gateway nodes 106. It will be appreciated that such aforementioned modules may be represented as a single module or a combination of different modules. The modules 235 may be implemented in the form of software, hardware and/or firmware.

As will be appreciated by those skilled in the art, the various logic elements can be embodied in discrete elements, software modules executed on a processor (e.g., processor 231) or any combination of software and hardware to achieve the functionality disclosed herein. For example, the transceiver, processor 231, memory 232, I/O interface 233 and storage may all be used cooperatively to load, store and execute the various functions disclosed herein and thus the logic to perform these functions may be distributed over various elements. Alternatively, the functionality could be incorporated into one discrete component. Therefore, the features of the gateway nodes 106 in FIG. 2c are to be considered merely illustrative and the disclosure is not limited to the illustrated features or arrangement.

Figure 2D:
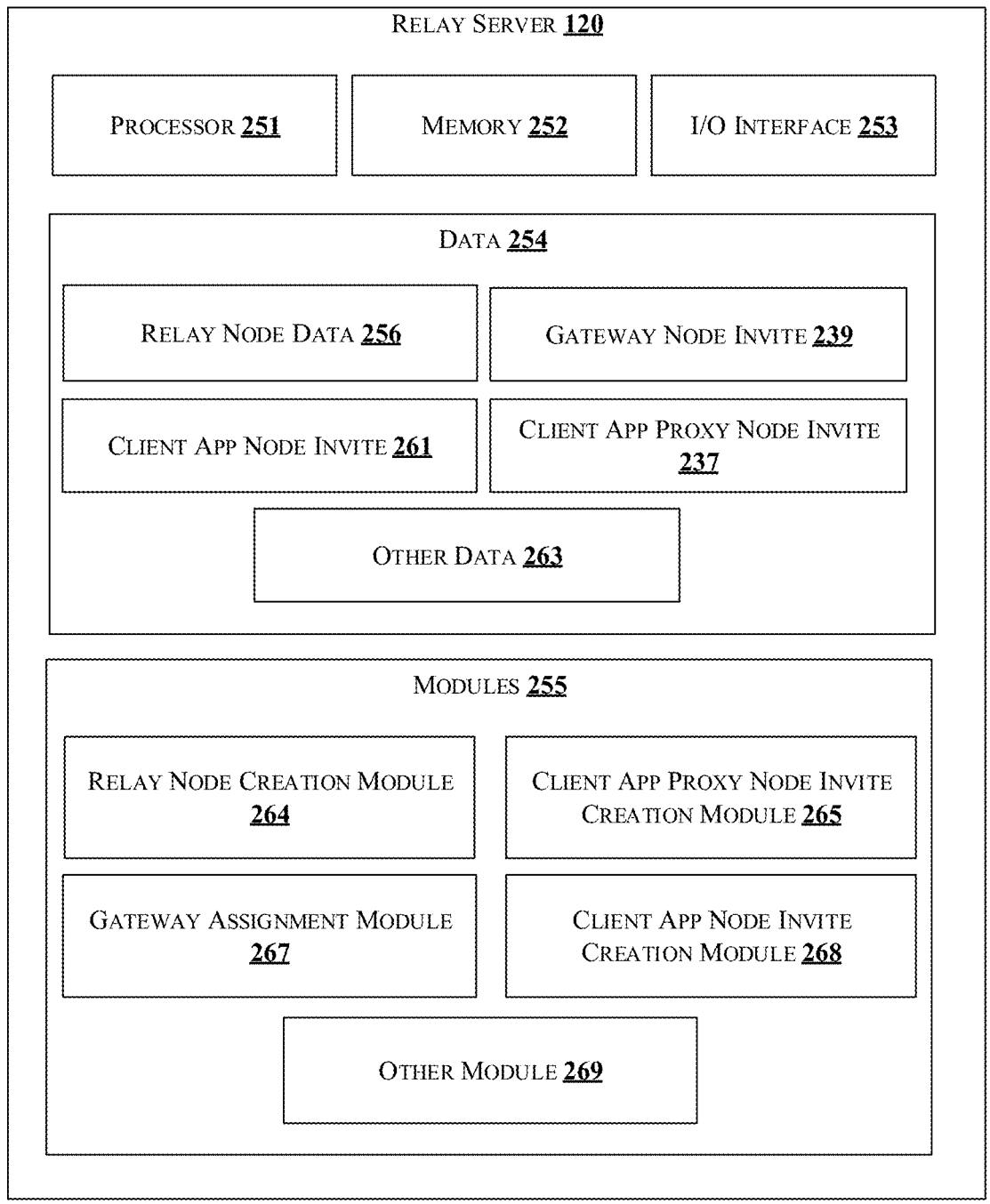
FIG. 2d illustrate an exemplary block diagram of a relay server in accordance with some embodiments of the present disclosure.

FIG. 2d illustrate an exemplary block diagram of the relay server 120 in accordance with some embodiments of the present disclosure;

The relay server 120 may be implemented as a plurality of structurally separate servers, or alternately may correspond to a single server. The relay server 120 enables provisioning, maintenance and deletion of relay nodes. The relay nodes establishes direct connection between peers if the peers are unable to establish a direct connection. In cases, when direct connection is not possible due to presence of sophisticated Network Address Translation (NAT) servers, firewalls, proxy servers in the network, the relay nodes establishes the direct connection. In one embodiment, if the client device 118 is unable to establish direct connection with the gateway nodes 106 to which the resources 112 are connected, a secure connection may be established through the relay server 120 which is known to any external client device or system.

The relay server 120 may be typical relay server as illustrated in FIG. 2d. The relay server 120 comprise a processor 251, a memory 252, and an I/O interface 253. The I/O interface 253 is coupled with the processor 251 and an I/O device. The I/O device is configured to receive inputs via the I/O interface 253 and transmit outputs for displaying in the display (not shown) of the I/O device via the I/O interface 253. Further, the relay server 120 may comprise additional components (not shown) such as a transceiver, a network interface, power controls, power source, storage and Hardware security module (HSM). The network interface enables connection of the relay server 120 with the management server 114 and the gateway nodes 106 via wired or wireless communication protocols. The HSM performs a variety of cryptographic operations such as key management, key exchange, encryption etc., to enable strong authentication and secure means of exchanging data with other devices in the mesh network 102.

The relay server 120 further comprises data 254 and modules 255. In one implementation, the data 254 and the modules 255 may be stored within the memory 252. In one example, the data 254 may include relay node data 256, the gateway node invite 239, the client app proxy node invite 237, client app node invite 261, and other data 263. The relay node data 256 may comprise data of the relay node 122 relating to the optimal routes established or existed between the gateway nodes 106 and the resources 112. In one example, the optimal routes may be stored in the storage. During operation, the relay server 120 enables provisioning, maintenance and removal of relay node 122. The relay server 120 provisions the relay node 122 when a request from one of the gateway nodes 106 for joining the mesh network 102 is received by the relay server 120. The management server 114 receives the request from one of the gateway nodes 106 and forwards the request of the gateway nodes 106 to the relay server 120. The request may comprise a request for creating the mesh network 102, if the mesh network 102 does not exist, and adding of the gateway nodes 106 to the mesh network 102. Upon receiving the request for creating the mesh network 102, the relay server 120 creates the Network management (NM) node that administers the gateway nodes 106 of the mesh network 102. The relay server 120 also generates the gateway node invite 239 using which the gateway nodes 106 may join the mesh network 102. In one embodiment, the gateway node invite 239 is generated by the NM node for each of the gateway nodes 106 to join the mesh network 102.

The relay server 120 further receives a request from the client device 118 to access the gateway nodes 106 and/or the resources 112 of the mesh network 102. In one embodiment, the relay server 120 receives a request from the client application of the client device 118 to connect to the relay node 122. In response, the relay server 120 creates the relay node 122 and also generates the client app proxy node invite 237 enabling the creation of the client app proxy node at the gateway nodes 106. The client app proxy node enables the client app node of the client application to connect with specific gateway node of the gateway nodes 106 to access the resources 112 connected with the specific gateway node. The client app node is an instance of the client application created in the mesh network 102 to serve as connecting node between the client application and the client app proxy node. The relay server 120 also generates the client app node invite 261 for enabling creation of the client app node by the client application.

In one embodiment, the data 254 may be stored in the memory 252 in the form of various data structures. Additionally, the aforementioned data can be organized using data models, such as relational or hierarchical data models. The other data 263 may also store data, including temporary data and temporary files, generated by the modules 255 for performing the various functions of the relay server 120.

The modules 255 may include, for example, a relay node creation module 264, a client app proxy node invite creation module 265, a gateway assignment module 267, and a client app node invite creation module 268. The relay node creation module 264 enables creation of the relay node 122 upon receiving a request from the client application to connect to the relay node 122. The client app proxy node invite creation module 265 of the relay server 120 generates the client app proxy node invite 237 for the creation of the client app proxy node at the gateway nodes 106. The client app proxy node enables the client app node of the client application to connect with specific gateway node of the gateway nodes 106 to access the resources 112 connected with the specific gateway node. The gateway assignment module 267 receives the request for creating the mesh network 102 and adding of the gateway nodes 106 to the mesh network 102 from the management server 114. Upon receiving the request for creation of the mesh network 102, the gateway assignment module 267 creates the Network management (NM) node and generates the gateway node invite 239 using which the gateway nodes 106 may join the mesh network 102. The client app node invite creation module 268 generates the client app node invite 261 for enabling creation of the client app node by the client application.

The modules 255 may also comprise other modules 269 to perform various miscellaneous functionalities of the relay server 120. It will be appreciated that such aforementioned modules may be represented as a single module or a combination of different modules. The modules 255 may be implemented in the form of software, hardware and/or firmware.

Figure 2E:
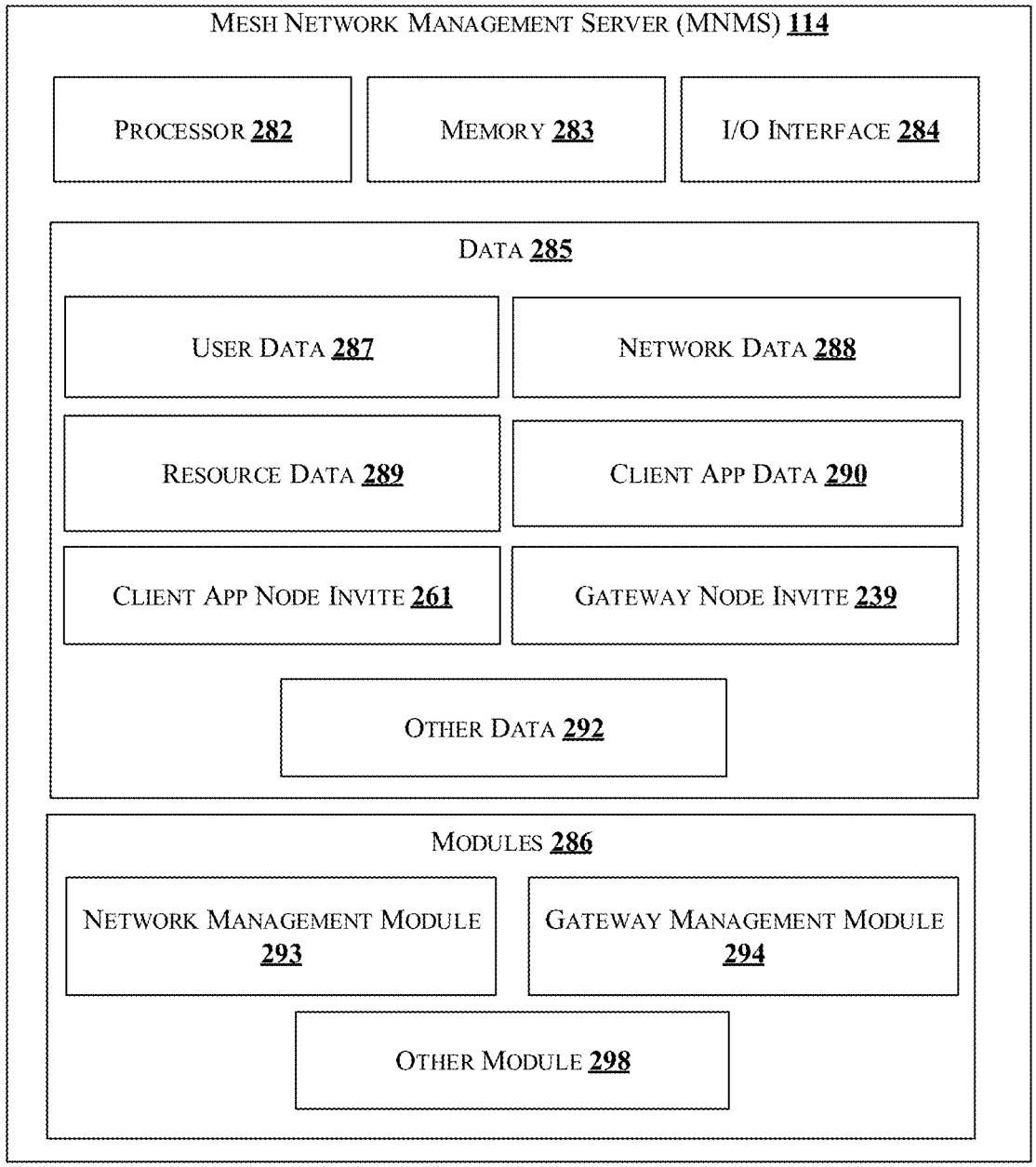
FIG. 2e illustrate an exemplary block diagram of a mesh network management server (MNMS) in accordance with some embodiments of the present disclosure.

FIG. 2e illustrate an exemplary block diagram of the management server 114 in accordance with some embodiments of the present disclosure;

The management server 114 may be implemented as a plurality of structurally separate servers, or alternately may correspond to a single server. The management server 114 is capable of validating and granting permission to a requesting entity based on the authorizations, permissions allocated to the entities. Entities may be for example, the gateway nodes 106, the client device 118, and client applications of the client device 118 requesting access to the resources 112. The management server 114 is also capable of storing network data (for example, the list of gateway nodes in a network) and forwarding mesh network management requests to the relay server 120, upon receiving a mesh network management request from the entity and authenticating the requesting entity.

The management server 114 may be typical management server as illustrated in FIG. 2e. The management server 114 comprises a processor 282, a memory 283, and an I/O interface 284. The I/O interface 284 is coupled with the processor 282 and an I/O device. The I/O device is configured to receive inputs via the I/O interface 284 and transmit outputs for displaying in the display (not shown) of the I/O device via the I/O interface 284. Further, the management server 114 may comprise additional components (not shown) such as a transceiver, a network interface, power controls, power source, storage and Hardware security module (HSM). The network interface enables connection of the management server 114 with the gateway nodes 106, the client device 118 and the relay server 120 via wired or wireless communication protocols. The HSM performs a variety of cryptographic operations such as key management, key exchange, encryption etc., to enable strong authentication and secure means of exchanging data with other devices in the mesh network 102.

The management server 114 further comprises data 285 and modules 286. In one implementation, the data 285 and the modules 286 may be stored within the memory 283. In one example, the data 285 may include user data 287, network data 288, resource data 289, client app data 290, the client app node invite 261, the gateway node invite 239 and other data 292. The user data 287 may comprise user ID and user role assigned to each user of the client application identified by the user ID. The network data (alternatively referred to as network information) 288 comprises network name, network ID, and gateway ID assigned to the gateway nodes 106 including ACL 238. The resource data 289 may comprise resource information including unique identifier of each resource and attribute information of the resources 112. The client app data 290 comprises information associated with the client applications and the client device 118. The client app node invite 261 enables creation of the client app node by the client application.

In one embodiment, the data 285 may be stored in the memory 283 in the form of various data structures. Additionally, the aforementioned data can be organized using data models, such as relational or hierarchical data models. The other data 292 may be also referred to as reference repository for storing reference data. The other data 292 may also store data, including temporary data and temporary files, generated by the modules 286 for performing the various functions of the management server 114.

The modules 286 may include, for example, a network management module 293 and a gateway management module 294. The gateway management module 294 enables provisioning and ownership of the one or more gateway nodes 106 before joining the mesh network 102. The network management module 293 enables the creation and management of the mesh network 102 such as adding or removal of the gateway nodes 106 and the resources 112. The modules 286 may also comprise other modules 298 to perform various miscellaneous functionalities of the management server 114. It will be appreciated that such aforementioned modules may be represented as a single module or a combination of different modules. The modules 286 may be implemented in the form of software, hardware and/or firmware.

In operation, if one or more devices/services wishes to provide access to the resources 112, either locally or remotely, then the devices/services need to register as the gateway nodes 106. The requesting devices/services are provisioned to become the gateway nodes 106. Gateway provisioning is a method of provisioning of license and firmware to requesting devices/services to function as the gateway nodes 106. In one embodiment, the requesting devices/services registers/connects with the management server 114 so as to allow the requesting devices/services to progress further/function as the gateway nodes 106.

Figure 3A:
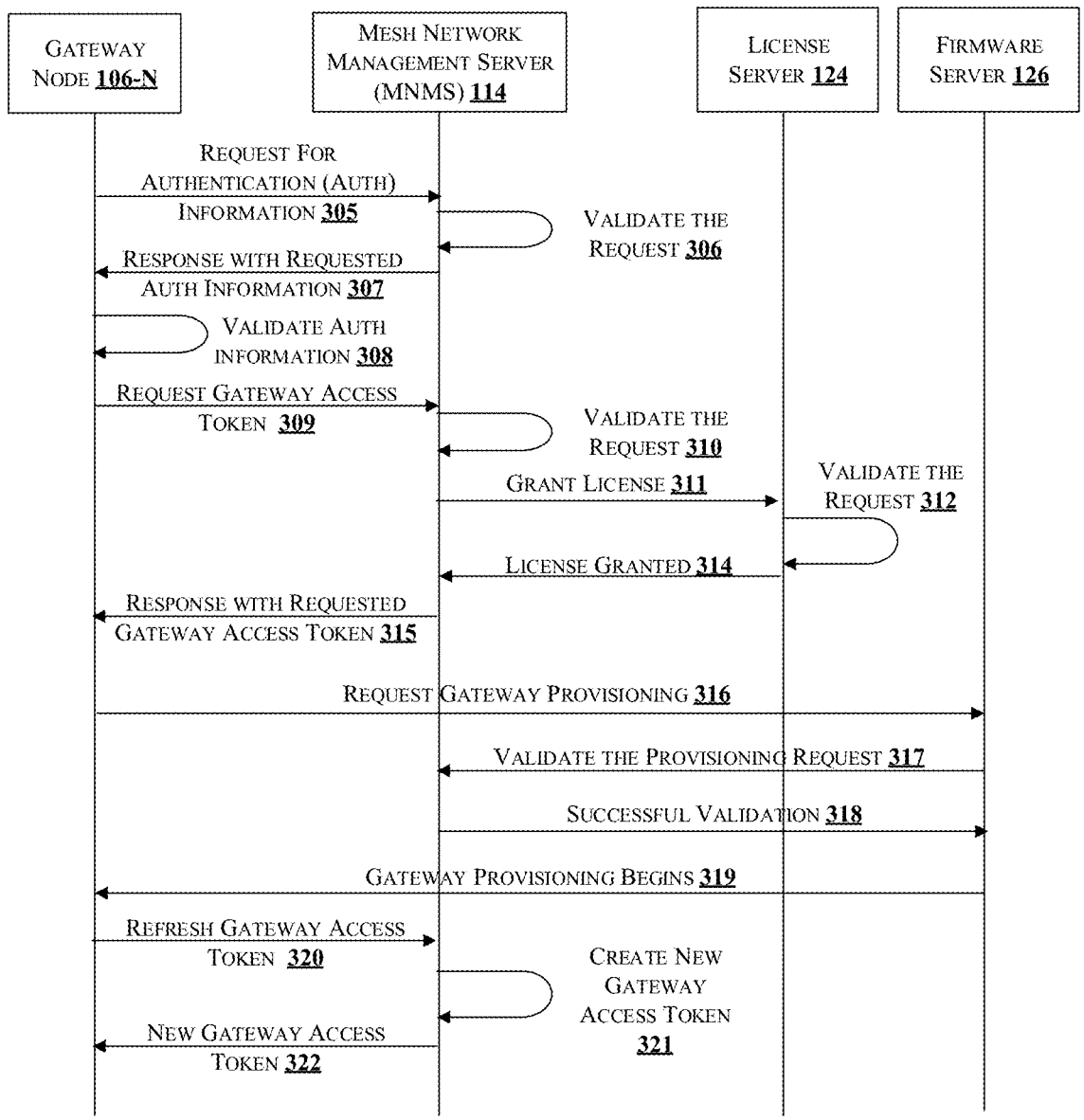
FIG. 3a illustrates an exemplary message sequence for provisioning of gateway node in accordance with some embodiments of the present disclosure.

FIG. 3a illustrates an exemplary message sequence for provisioning of gateway in accordance with some embodiments of the present disclosure.

The provisioning is initiated by authentication of the management server 114 and the gateway nodes 106. As illustrated in FIG. 3a, each of the gateway nodes 106 may request for authentication of the management server 114 by transmitting a request for authentication information to the management server 114 at step 305. The request may comprise for example, the product serial number of each of the requesting gateway nodes 106 and an encrypted console password. In one embodiment, the encrypted console password may be a randomly generated string at time of manufacturing the gateway nodes 106 that is encrypted and stored in persisted file system. The management server 114 receives the request, decrypts and validates the console password at step 306. The management server 114 then provides the response with the requested authentication information, for example, MAC address at step 307. Each of the requesting gateway nodes 106 receives the response and validates the received authentication information to authenticate the management server 114 at step 308. On successful validation, each of the gateway nodes 106 authenticates the management server 114 and proceeds to self-authenticate the gateway nodes 106.

In one embodiment, each of the gateway nodes 106 transmit a request for the gateway access token by self-authentication at step 309. The request may comprise authentication information such as the product serial number of each of the requesting gateway nodes 106 and at least one encrypted parameter requested by the management server 114. The encrypted parameters may be one or more encrypted codes, each encrypted code may be a UUID (Universally Unique Identifier) for each of the gateway nodes 106 that is stored on each of the gateway nodes 106 and the management server 114 to allow self-authentication before provisioning of license and firmware to the each of the gateway nodes 106. The encrypted code is encrypted and decrypted using cryptographic private and public keys stored on each of the gateway nodes 106 and the management server 114. In one embodiment, the hardware security module (HSM) in each of the gateway nodes 106 may be configured to perform key management for authentication of each of the gateway nodes 106.

The management server 114 receives the request, decrypts and validates the encrypted codes at step 310 using cryptographic keys stored in the management server 114. Upon successful validation, the management server 114 authenticates each of the gateway nodes 106 and proceeds to provisioning of the license. In one embodiment, the management server 114 requests the license server 124 for granting the license to each of the gateway nodes 106 at step 311. In one example, the request for grant of license comprise the UUID of each of the validated gateway nodes 106. On receiving the request for license, the license server 124 validates the request at step 312 to determine availability of the license and grants a license key to each of the gateway nodes 106 at step 314.

The management server 114 receives the granted license, and generates new cryptographic keys, the gateway access token 236 and a gateway refresh token. The gateway access token 236 is an access token generated by the management server 114 to be used by each of the gateway nodes 106 to authenticate the gateway nodes 106 to the management server 114. The gateway access token 236 may be set with an expiry time period, and upon the expiry of the set time period, the gateway nodes 106 may request for a fresh gateway access token, with a fresh expiry or time period, using the gateway refresh token. The gateway refresh token is also created by the management server 114 using randomly generated string which is known only to the management server 114 and the gateway nodes 106. The management server 114 may verify the gateway refresh token and issue a new gateway access token upon successful verification. The management server 114 transmits the new cryptographic keys along with the gateway access token 236 and the gateway refresh token to each of the gateway nodes 106 at step 315 completing the process of provisioning of the license.

Each of the gateway nodes 106 may initiate the provisioning of the firmware by requesting the firmware server 126 at step 316. The request for provisioning of the firmware may comprise the gateway access token 226. The firmware server 126 forwards the gateway access token 236 to the management server 114 for validation of the provisioning request at step 317. In another embodiment, the firmware server 126 validates the provisioning request by using the cryptographic keys of the management server 114 stored locally. Upon successful verification of the gateway access token 236 and validation of the provisioning request, the management server 114 transmits a SUCCESS message to the firmware server 126 at step 318. In response to receiving the SUCCESS message, the firmware server 126 initiates the provisioning of the firmware at step 319. Upon completion of the firmware provisioning, each of the gateway nodes 106 may request for a new gateway access token and the gateway refresh token at step 320. The management server 114 validates the gateway refresh token and generates the new gateway access token along with an updated expiry time period at step 321. The management server 114 forwards the new gateway access token along with the gateway refresh token to each of the gateway nodes 106 at step 322 thus completing the provisioning of each of the gateway nodes 106. On completion of the provisioning of the gateway nodes 106, the ownership of the gateway nodes 106 have to be established.

All the above described steps of the gateway nodes 106 for gateway provisioning are performed by the gateway management module 246 of the gateway nodes 106 and all the steps of the management server 114 are performed by the gateway management module 294 of the management server 114. Each of the gateway nodes 106 communicates with the management server 114 via the network interface of the gateway nodes 106. The management server 114 communicates with the gateway nodes 106 via the network interface of the management server 114.

Figure 3B:
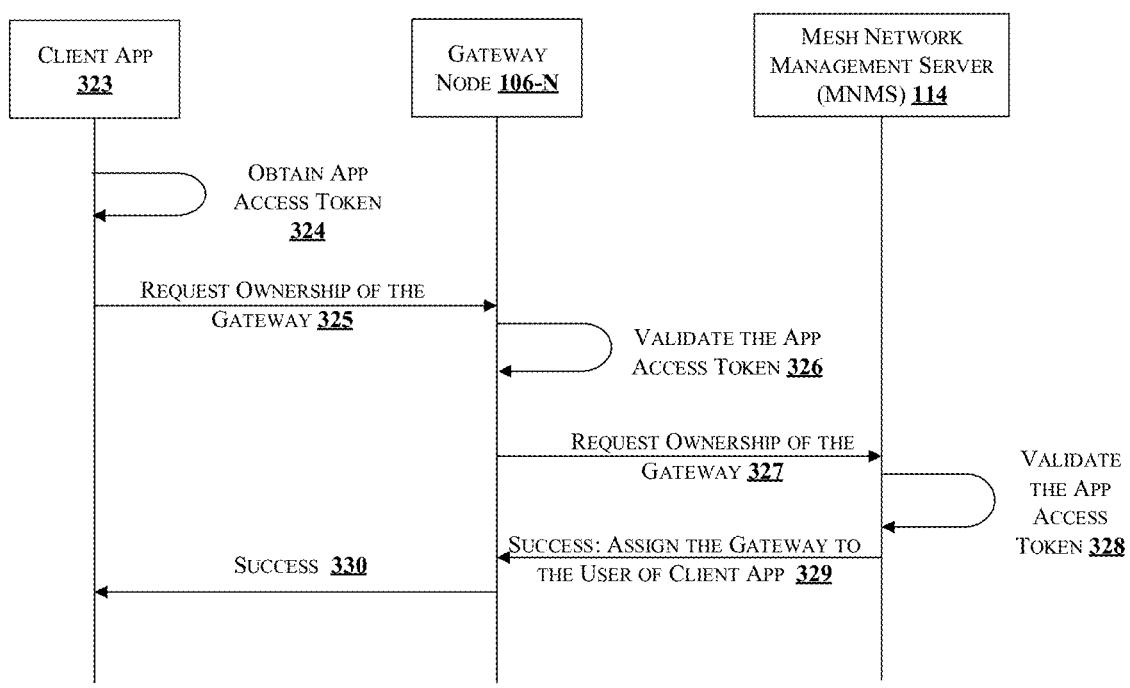
FIG. 3b illustrates an exemplary message sequence for establishing ownership of gateway in accordance with some embodiments of the present disclosure.

After gateway provisioning, gateway ownership is the next primary step in order to enable control of functionality of each of the gateway nodes 106 by a user. FIG. 3b illustrates an exemplary message sequence for establishing ownership of gateway by the user in accordance with some embodiments of the present disclosure.

In one example, the user may be interchangeably referred as owner of each of the gateway nodes 106 and the owner may control the functionality of each of the gateway nodes 106 using a user device. The user device may be for example, the client device 118 having a client application 323 integrated within the client device 118. The client device 118 and each of the gateway nodes 106 may be set in pairing mode to enable the communication there between. The owner may login into the client application 323 and request for ownership of each of the gateway nodes 106 using the user access token 241. In one embodiment, the client application 323 may request for a fresh user access token from an external authorization server (not shown) at step 324 as illustrated in FIG. 3b. The fresh user access token may be hereinafter referred to as the user access token 241. Upon receiving the user access token 241, the client application 323 may send the request for ownership to the gateway nodes 106 at step 325, where the request for ownership may comprise the fresh user access token.

Each of the gateway nodes 106 receives the ownership request and validates the user access token 236 at step 326. On successful validation, each of the gateway nodes 106 transmits a request for owning the gateway nodes 106 to the management server 114 at step 327. In one example, the request comprises the gateway access token 236 and the app access token 240. The management server 114 validates the gateway access token 236 and the app access token 240 at step 328, and upon successful verification, transmits a SUCCESS message to each of the gateway nodes 106 at step 329. In one example, the SUCCESS message of step 329 represents assignment of each of the gateway nodes 106 to the user of the client application 323 so as to control each of the gateway nodes 106 via the client application 323. Each of the gateway nodes 106 further transmits another SUCCESS message to the client application 323 at step 330 indicating the assignment and completion of gateway ownership process.

All the above described steps for gateway ownership are performed by the gateway management module 246 of each of the gateway nodes 106, and the gateway management module 294 of the management server 114. Each of the gateway nodes 106 communicates with the management server 114 via the network interface of the gateway nodes 106. The client application 323 communicates with the gateway nodes 106 using a client app interface module configured in the client device 118.

After provisioning and ownership of the gateway nodes, each of the gateway nodes may be added to existing or non-existing mesh network specified by the owner of each of the gateway nodes. In one embodiment, if the mesh network specified by the owner is determined to not exist, then a new mesh network is created before adding the gateway nodes. In another embodiment, if the specific mesh network is existing, then the each of the gateway nodes is added to the existing mesh network.

Figure 3C:
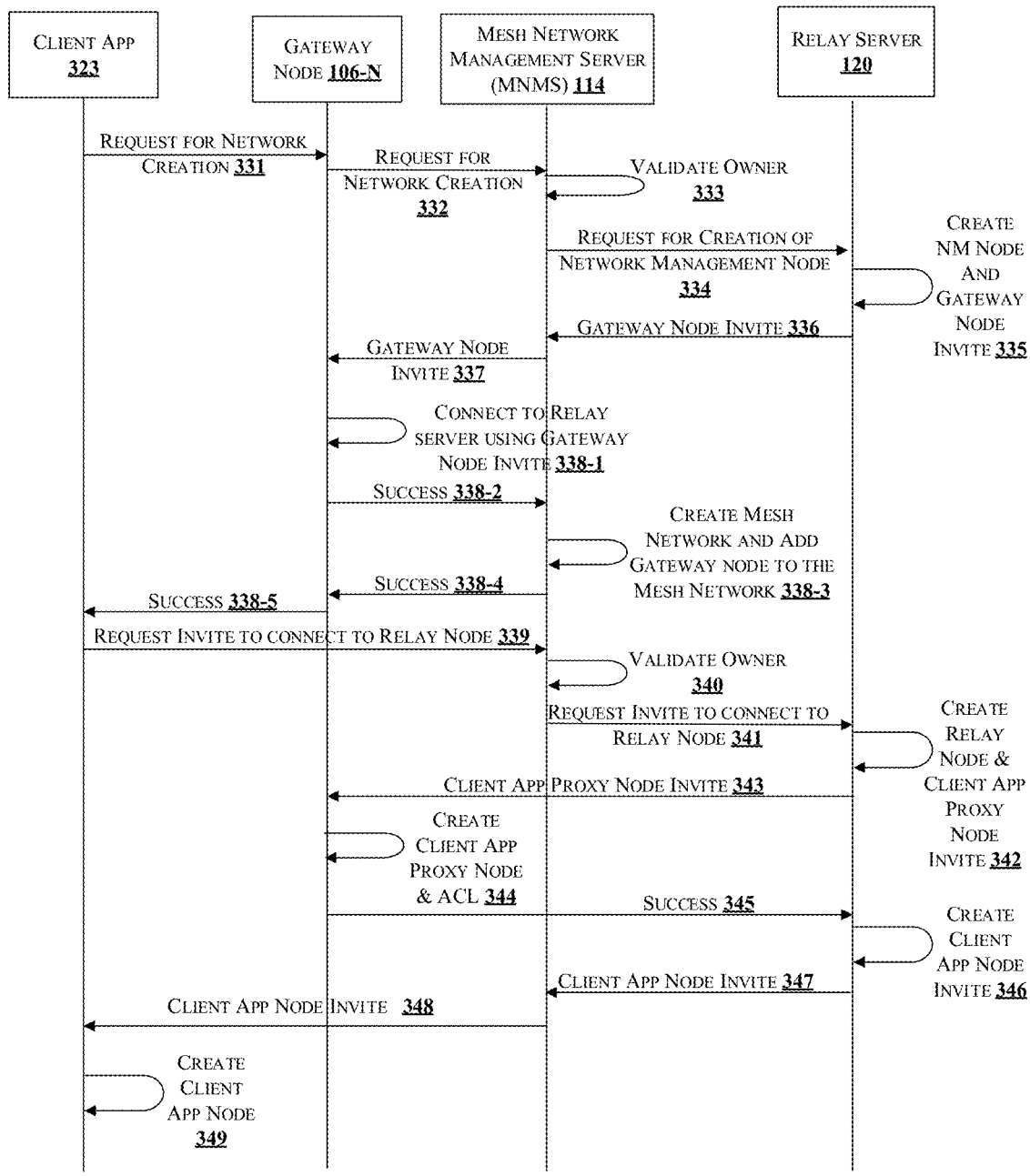
FIG. 3c illustrates an exemplary message sequence for adding gateway node to a new network in accordance with some embodiments of the present disclosure.

FIG. 3c illustrates an exemplary message sequence for adding each of the gateway nodes 106 to a new mesh network in accordance with some embodiments of the present disclosure.

A gateway node may be added to a new mesh network on receiving a request from the owner of the gateway node. In one example, an onboard diagnostics system (OBDS) of a car is a gateway node 106-N that is added to a new mesh network by the owner of the OBDS. The OBDS if added to the new network enables the owner of the OBDS to access the resources such as lighting unit 112-10, fuel meter 112-9, access door 112-11 and so on.

In one embodiment, the owner of the gateway node 106-N may send a request for joining the new mesh network 102 via the client application 323 communicatively coupled or paired with the gateway node 106-N. The owner of the gateway node 106-N logs in into the client application 323 and requests for addition of gateway node 106-N to the new mesh network 102. The request may comprise for example, name of the new mesh network 102 and the user access token 241 associated with the client application 323. In one embodiment, the client application 323 requests the gateway node 106-N for network creation at step 331. The gateway management module 246 of the gateway node 106-N receives the network creation request and generates a second request for network creation that includes the gateway access token 236 in addition to network name and the user access token 241. The gateway management module 246 forwards the second request to the management server 114 at step 332.

The network management module 293 of the management server 114 receives the second request, and validates the gateway access token 236 and the user access token 241 at step 333 to determine whether the user is the owner of the gateway node 106-N. In one example, the network management module 293 verifies the ownership of the owner of the OBDS. The network management module 293 of the management server 114 further verifies that there exists no other mesh network with the same mesh network name as provided in the second request received from the gateway management module 246 of the gateway node 106-N. On successful verification of ownership rights and non-existence of requested mesh network, the network management module 293 generates a request for creation of a network management (NM) node for the new network and transmits the request to the relay server 120 at step 334. In one example, the request for creation of the NM node comprises the network ID assigned by the management server 114 to the mesh network 102. The gateway assignment module 267 of the relay server 120 creates the NM node with the network ID and generates the gateway node invite 239 at step 335. In one embodiment, the NM node is a node created for each mesh network to administers all the gateway nodes in the same mesh network. The NM node is configured to enable addition and removal of the gateway nodes 106, and addition and deletion of users. In one example, the gateway node invite 239 is the invite for the OBDS to join the mesh network 102.

The gateway assignment module 267 forwards the gateway node invite 239 to the management server 114 at step 336. The network management module 293 of the management server 114 receives and updates the gateway node invite 239 with the network ID assigned to the mesh network 102. The network management module 293 then forwards the updated gateway node invite 239 to the gateway node 106-N at step 337. The gateway node 106-N receives the updated gateway node invite 239 and connects to the relay server 120 using the received updated gateway node invite 239 at step 338-1. In one example, the OBDS receives the updated gateway node invite 239, and connects to the relay server 120 using the received updated gateway node invite 239. The gateway management module 246 also transmits a SUCCESS message at step 338-2 to the management server 114 for creation of the mesh network 102 and addition of the gateway node 106-N to the mesh network 102. The network management module 293 creates the mesh network 102 and adds gateway node 106-N to the mesh network 102 at step 338-3. On successful addition of the gateway node 106-N to the mesh network 102, the network management module 293 of the management server 114 transmits a SUCCESS message to the gateway node 106-N at step 338-4. The gateway management module 246 of the gateway node 106-N further transmits a SUCCESS message to the client application 323 at step 338-5 confirming addition of the gateway node 106-N to the mesh network 102.

After successful addition of the gateway node 106-N to the mesh network 102, the client application 323 may need to establish connection with the relay node 122 for accessing the resources 112. The relay node 122 is capable of enabling peer-to-peer connection between the client application 323 on the client device 118 and the gateway node 106-N to enable access to the resources 112 connected with the gateway node 106-N. In one embodiment, the client application 323 may transmit a request to the management server 114 for connecting with the relay node 122 at step 339. The management server 114 receives the request and validates the user of the client application 323 for connecting with the relay node 120 at step 340. In one example, the request may comprise the network ID, the app access token 240, and the user access token 241. In another example, the request may comprise a single access token comprising both the app access token 240 and the user access token 241 combined as the single access token along with the network ID. In yet another example, the request may comprise a randomly generated secret passcode instead of either the app access token 240 or the user access token 241 along with the network ID. The management server 114 verifies that the user of the client application 323 is the owner of the mesh network 102 having the network ID received in the request.

On successful verification, the management server 114 updates the request to connect to the relay node 122 by including additional parameters and transmits the request to the relay server 120 at step 341. The additional parameters may be associated with the validated user and the client application used by the verified user. For example, the additional parameters may include network ID, user ID, user role, client app ID, client app access list, and user access list. User ID may refer to the login name of the owner of the client application 323 and user role may indicate that the user is an owner. The app ID may refer to unique identifier (ID) of the client application 323 through which the owner communicates with the gateway node 106-N. The app access list may comprise list of capabilities that the client application 323 is permitted to access in the resources 112.

As mentioned in previous paragraphs, each of the resources 112 may comprise at least one endpoint, each endpoint is provided with a list of capabilities that the client application is permitted to access. In one example, if the switch panel is the resource and one or more switches may be the endpoints. Each switch may be configured with at least one capability like ON/OFF, level control and so on. For example, if switch A may be assigned with ON/OFF capability, and switch B may be assigned with ON/OFF capability as well as level control capability to the endpoint B. The client application 323 may not be able to access the level control capability in endpoint A or any capability of endpoint C that are not granted to the client application.

The network management module 293 of the management server 114 stores the client app ID, and the client app access list as the client app data 290. The network management module 293 maintains the user data 287 comprising the user ID and user role assigned to each user identified by the user ID. The network management module 293 also stores the network data 288 such as including network name, network ID, and gateway ID assigned to the mesh network 102. Furthermore, the network management module 293 also maintains the resource data 289 such as including list of resources 112, user access list and capabilities of each of the resources 112 as per the user access list. The network management module 293 also stores the app ID and the app access list of all the client app nodes as the client app data 290. In another embodiment, the network management module 293 may grant a license to the user for one or more of the features of the system under one or more schemes, for example, granting a license for each client application on each client device for each user.

The relay node creation module 264 of the relay server 120 receives the request for creation of the relay node 122 and creates the relay node 122 and the client app proxy node invite 237 at step 342. In one embodiment, if the user or the client device 118 does not require remote connectivity access permission to the relay node 122 as per the permissions stored in the management server 114, then the relay node creation module 264 does not create the relay node 122. In another embodiment, the relay node creation module 264 creates the relay node 122 only if the client device 118 is remotely located from the gateway node 106-N (i.e., public network). The client app proxy node invite creation module 265 generates and transmits the client app proxy node invite 237 at step 343 to the gateway node 106-N that joined the mesh network 102 of the network ID.

The client app proxy node creation module 245 of the gateway node 106-N receives the client app proxy node invite 237 from the relay server 120 and creates the client app proxy node and the ACL 238 associated with the client app proxy node at step 344. The client app proxy node creation module 245 then transmits a SUCCESS message to the relay server 120 at step 345 indicating successful creation of the client app proxy node and the ACL 238 at the gateway node 106-N. The client app node invite creation module 268 of the relay server 120 receives the SUCCESS message and creates the client app node invite 261 at step 346 and transmits the client app node invite 261 at step 347 to the management server 114. The management server 114 forwards the client app node invite 261 to the client device 118 at step 348. The client application 323 creates a client app node for the client application 323 at step 349, thereby forming the client app mesh network. In one example, the client app mesh network may comprise the client app node, the client app proxy node for the gateway node 106-N and the relay node 122.

In another embodiment, the client app node joins the device mesh network without a client app proxy node or the relay node 122 being created. The relay server 120 transmits a request to the network management node of the device mesh network to generate the client app node invite 261 for the client app node to join the device mesh network. The client app node invite 261 is then forwarded to the management server 114 that in turn forwards further to the client application 323 where the client app node connects to the relay server 120 and joins the device mesh network.

Figure 3D:
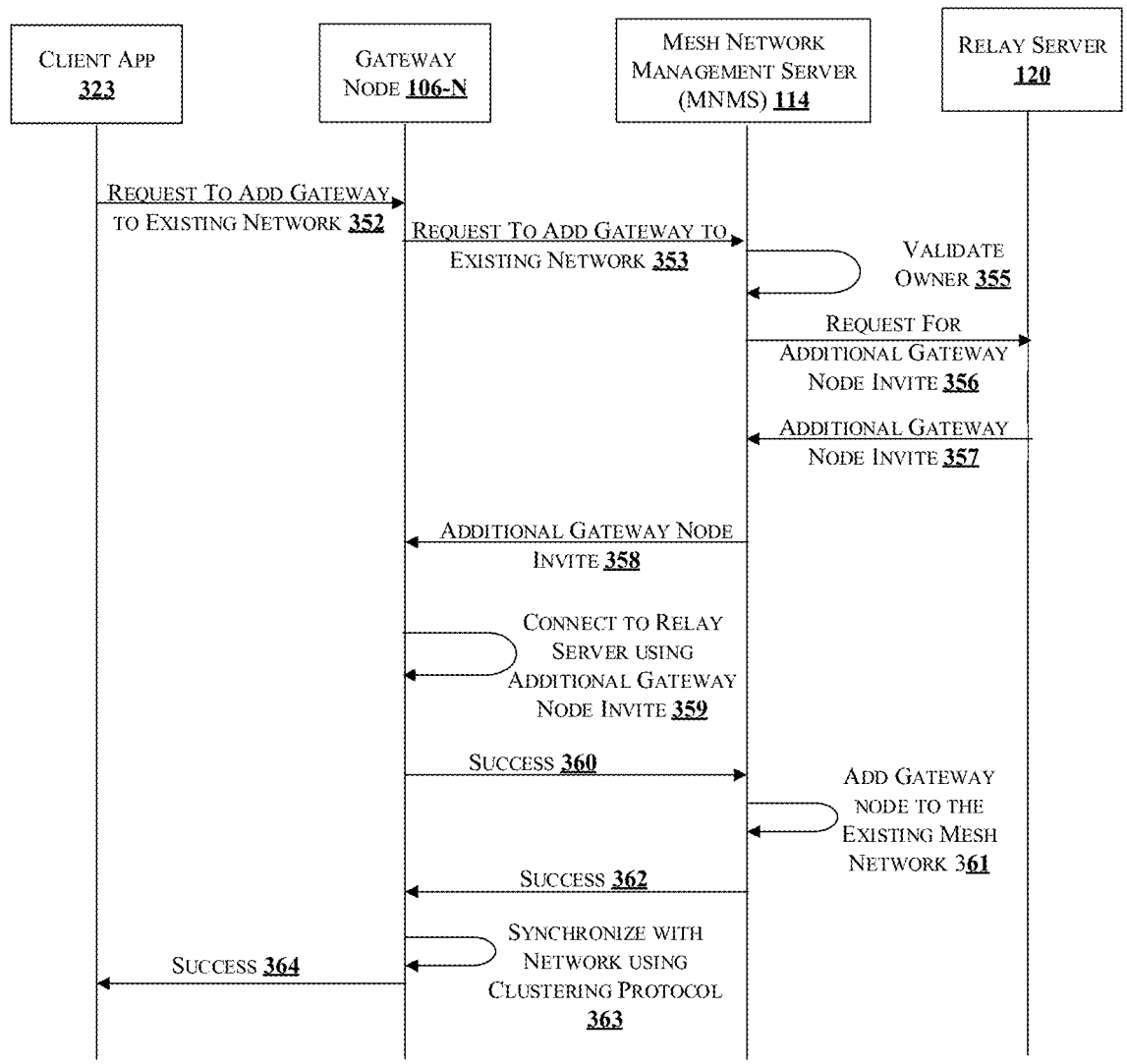
FIG. 3d illustrates an exemplary message sequence for adding gateway node to an existing network in accordance with some embodiments of the present disclosure.

In another embodiment, each of the gateway nodes 106 may be added to an existing mesh network specified by the user. FIG. 3d illustrates an exemplary message sequence for adding gateway node to the existing network in accordance with some embodiments of the present disclosure. In one embodiment, the client application 323 transmits a request to add the gateway node 106-N for example, a vehicle charging port as new gateway node to the existing mesh network 102 having the OBDS at step 352. The request to add the gateway node 106-N to the existing mesh network 102 may comprise for example, network data 288 including network ID and the user access token 241. The gateway management module 246 of the gateway node 106-N updates the network joining request by including the gateway access token 236 and forwards the updated request to the management server 114 at step 353.

The management server 114 receives the updated request and validates the request at step 355. In one embodiment, the network management module 293 of the management server 114 receives the updated request, and validates the gateway access token 236 and the user access token 241 at step 355 to determine whether the user is the owner of the gateway node 106-N. In one example, the network management module 293 verifies the ownership of the owner of the OBDS. The network management module 293 of the management server 114 maintains the list of users, and the gateway nodes 106 owned by each user, and corresponding gateway access token 236. On successful determination of ownership rights, the network management module 293 generates a request for additional gateway node invite and transmits the request for additional gateway node invite to the relay server 120 at step 356.

The relay server 120 creates the additional gateway node invite to the gateway node 106-N using the network management node of the existing mesh network 102 at step 357. In one embodiment, the relay server 120 transmits the additional gateway node invite to the management server 114. The network management module 293 of the management server 114 forwards the additional gateway node invite to the requesting gateway node 106-N. The gateway node 106-N receives the additional gateway node invite and connects to the relay server 120 using the additional gateway node invite. In one embodiment, the gateway management module 246 receives the additional gateway node invite and connects to the relay server 120 at step 359 and transmits a SUCCESS message to the management server 114 at step 360.

The network management module 293 of the management server 114 receives the SUCCESS message from the gateway node 106-N, adds the gateway node 106-N i.e., OBDS to the existing mesh network 102 at step 361 and transmits a SUCCESS message to the gateway node 106-N at step 362. The gateway management module 246 of the gateway node 106-N connects with the relay server 120 using the additional gateway node invite and synchronizes resource data 289 and network data 288 with all other gateway nodes of the mesh network 102 using clustering protocol at step 363. In one example, the resource data 289 information of each of the gateway nodes 106 includes list of resources, endpoints and capabilities, and current attributes values of the resources 112. The network data 288, for example, refers to gateway node information and ACL 238. In one embodiment, the gateway management module 246 of the gateway node 106-N i.e., OBDS receives a copy of network information from other gateway nodes such as gateway node 106-1, 106-2 and 106-3 and updates the ACL 238. The gateway node 106-N transmits a SUCCESS message to the client application 323 at step 364, thus completing addition of the gateway node 106-N to the existing mesh network 102.

In one embodiment, the user of the client application 323 has permissions to add, delete the resources 112, add and remove users of the client application 323 and the client device 118, and remove specific user's access to either specific resources on the mesh network 102 or the entire mesh network 102 or remove access from a specific client device 118, thereby revoking the client app nodes on the client device 118 from the mesh network 102.

Figure 4A:
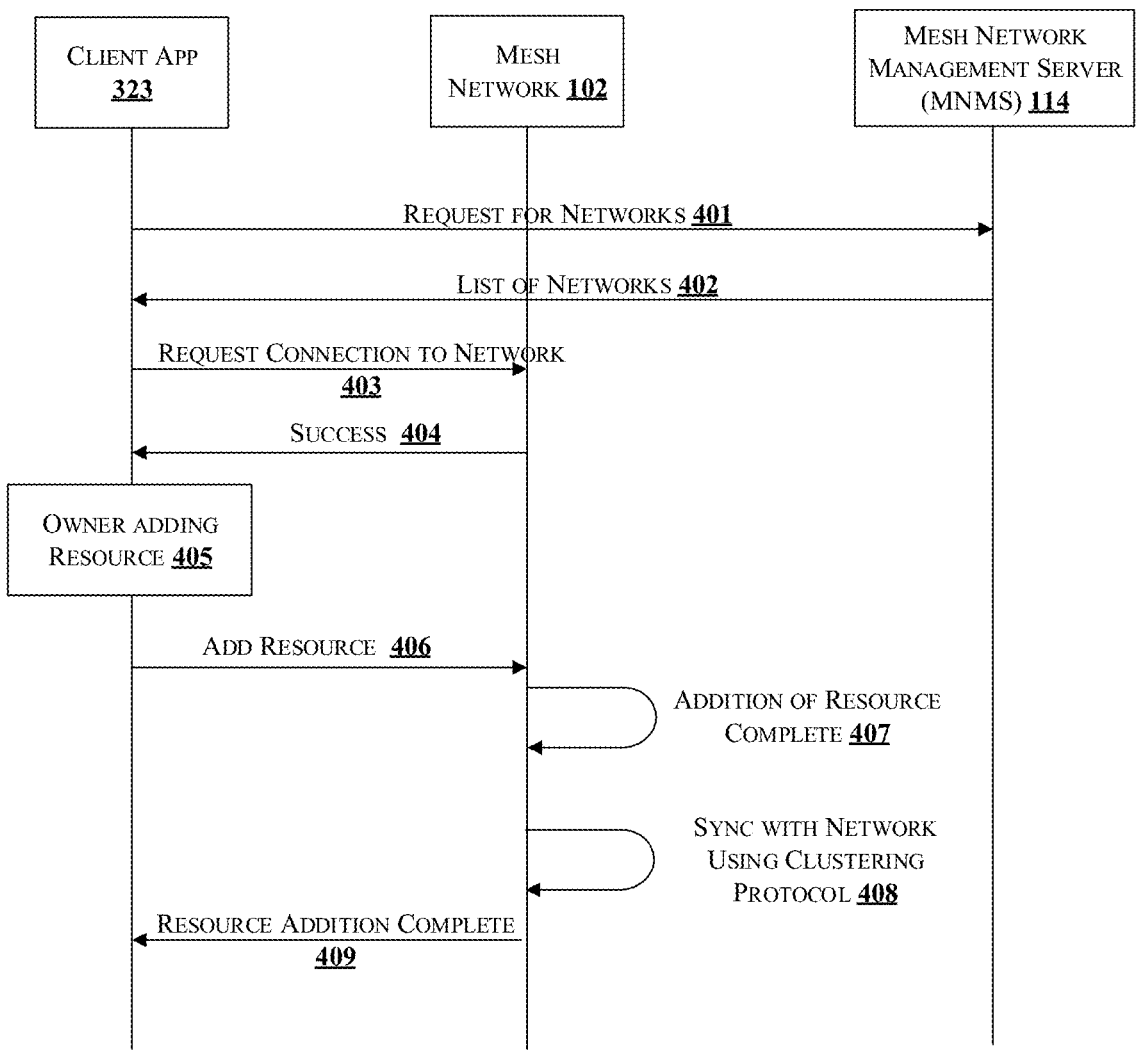
FIG. 4a illustrates an exemplary message sequence for adding resource to network in accordance with some embodiments of the present disclosure.

FIG. 4a illustrates an exemplary message sequence for adding a resource to network in accordance with some embodiments of the present disclosure.

In an embodiment, a gateway node adds a resource to a mesh network and synchronizes the ACL with all other gateway nodes of the same mesh network. If a user wishes to add resources 112 to the mesh network 102, the user makes a request via the client application 323. In one example, the client device 118 may have the resource 112-N i.e., USB port having a unique identifier "R1", and whenever a USB is plugged into the USB port, the client application 323 receives a request for adding the media on the USB as resource to the mesh network 102. The client application 323 forwards the received request to the gateway node 106-1 i.e., OBDS 106-1. Based on the request received, the gateway node 106-1 i.e., OBDS adds the USB 112-N on the USB port as a resource. In one embodiment, the gateway node 106-1 adds the resource 112-N to the same mesh network 102 to which the gateway node 106-1, i.e., OBDS is already connected.

As illustrated in FIG. 4a, the client application 323 transmits a request, for a list of available mesh network 102 accessible by the user, to the management server 114 at step 401. The request may comprise for example, the user access token 241 of the client application 323. The network management module 293 of the management server 114 validates the user access token 241 and upon successful verification, the network management module 293 forwards the list of available mesh network 102 to the client application 323 at step 402.

The user of the client application 323 may select the mesh network 102 to connect to and upon user selection, the client application 323 generates a request to connect to the selected mesh network 102 at step 403. On successful connection with the selected mesh network 102, the selected mesh network 102 transmits a SUCCESS message to the client application 323. In one embodiment, the gateway nodes 106 of the mesh network 102 transmits the SUCCESS message to the client application 323 at step 404. In one example, if the mesh network 102 comprises the gateway nodes 106-1 and 106-2, both the gateway nodes 106-1 and 106-2 may transmit the SUCCESS message to the client application 323. The user of the client application 323 may select the option of adding the resource 112 to the mesh network 102 and select a corresponding gateway node available in the mesh network 102 to which the client application 323 is connected with. For example, the user of the client application 323 may select the option of adding the resource 112-N to the mesh network 102 and selects the corresponding gateway node 106-1 at step 405. The client application 323 requests the corresponding gateway nodes 106 to add the resources 112. In one example, the client application requests the gateway node 106-1 to add the resource 112-N at step 406. The gateway nodes 106 completes the addition of the resources 112 and synchronize network data 288 including the ACL 238. In one example, the gateway node 106-1 completes the on-boarding or addition of the resource 112-N at step 407 and upon successful completion, the gateway nodes 106-1 and 106-2 synchronizes the ACL 238 at the respective gateway nodes 106-1 and 106-2 at step 408. The gateway node 106-1 transmits a confirmation message to the client application 323 indicating completion of addition of the resource 112-N at step 409, thus enabling addition of the resource 112-N in the mesh network 102.

Figure 4B:
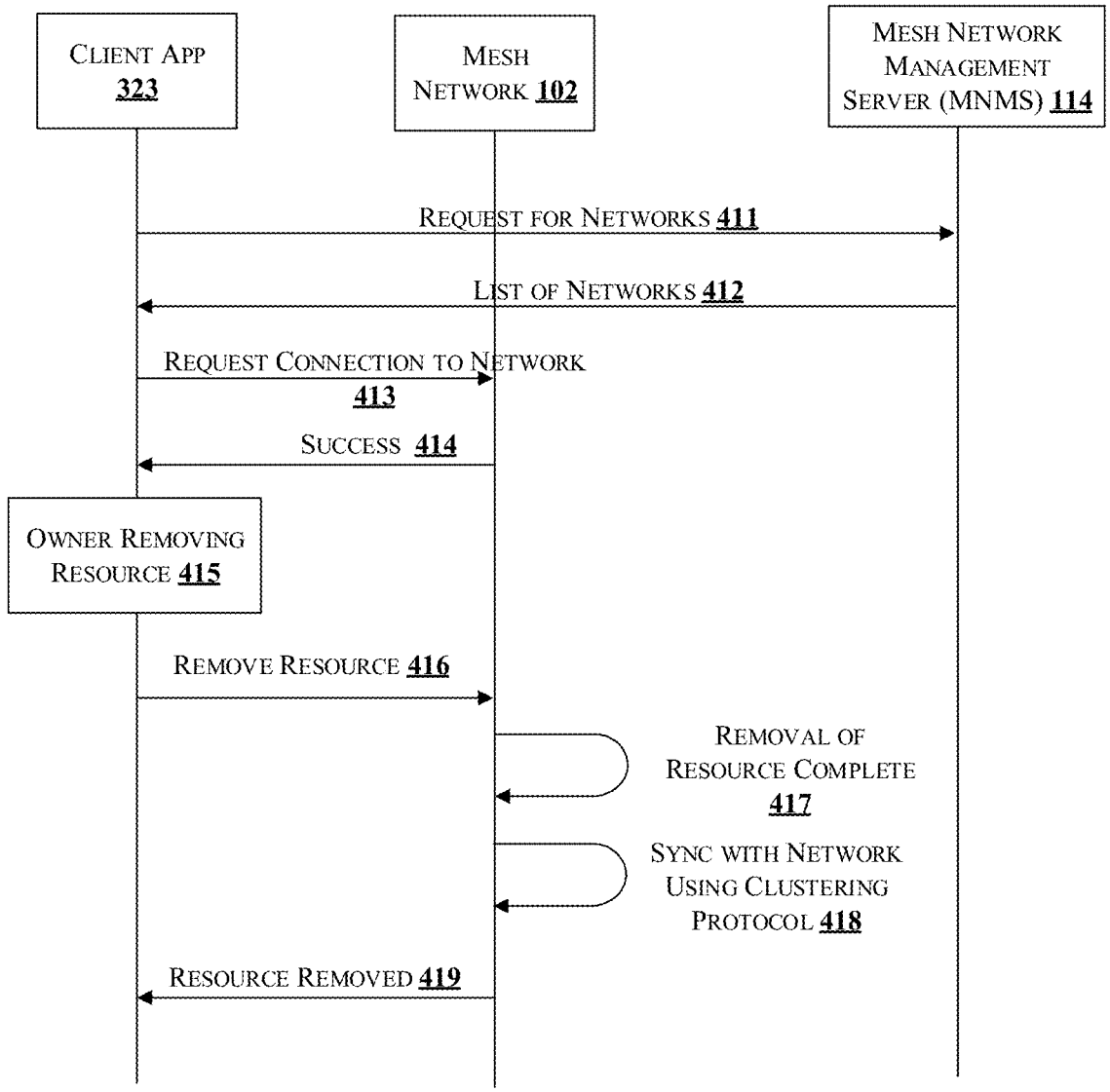
FIG. 4b illustrates an exemplary message sequence for removing resource from network in accordance with some embodiments of the present disclosure.

FIG. 4b illustrates an exemplary message sequence for removing resource from network in accordance with some embodiments of the present disclosure.

The client application 323 may request for removal of the resources 112 from the mesh network 102. If a user wishes to remove resources 112 from the mesh network 102, the user makes such a request via the client application 323. Based on the user request, the client application 323 may select a specific mesh network for removing the resource 112. In one example, the client device 118 may have access to the resource 112-5 i.e., temperature sensor having a unique identifier "R2". If the user wishes to remove resource 112-5 from the mesh network 102, the user makes such a request via the client application 323. Based on the user request, the client application 323 may select a specific mesh network for removing the resource 112-5. As illustrated in FIG. 4b, the client application 323 transmits a request for a list of available mesh network 102, accessible by the user, to the management server 114 for selecting the specific mesh network at step 411. The request may comprise, for example, the app access token 240 of the client application 323. The network management module 293 of the management server 114 validates the permissions of the client application 323 in providing the list of the mesh network 102. On successful verification, the network management module 293 forwards the list of the mesh network 102 to the client application 323 at step 412.

The user of the client application 323 may select the mesh network 102 to connect to and upon user selection, the client application 323 generates a request to connect to the selected mesh network 102 at step 413. On successful connection with the mesh network 102, the mesh network 102 transmits a SUCCESS message to the client application 323. In one embodiment, the gateway nodes 106 of the mesh network 110 transmits the SUCCESS message to the client application 323 at step 414. In an illustrated example, if the mesh network 102 comprises the gateway nodes 106-1 and 106-2, the gateway nodes 106-1 and 106-2 may transmit the SUCCESS message to the client application 323. The user of the client application 323 may select the option of removing the resource 112 from the mesh network 102 and selects the corresponding gateway node 106. In one example, the user of the client application 323 may select the option of removing the resource 112-5 from the mesh network 102 and selects the corresponding gateway node 106-2 at step 415. The client application 323 thereafter requests the corresponding gateway node 106 to remove the resource 112. For example, the client application 323 requests the gateway node 106-2 to remove the resource 112-5 at step 416. The gateway nodes 106 completes the removal of the resources 112 and synchronize network data 288 including the ACL 238. In one example, the gateway node 106-2 completes the removal of the resource 112-5 at step 417 and upon successful completion, the gateway nodes 106-1 and 106-2 synchronizes the ACL 238 at the gateway nodes 106-1 and 106-2 based on the removal of the resource 112-5 at step 418. The gateway node 106-2 transmits a confirmation message to the client application 323 indicating completion of removal of the resource 112-5 at step 419, thus enabling removal of the resource 112-5 from the mesh network 102.

Figure 4C:
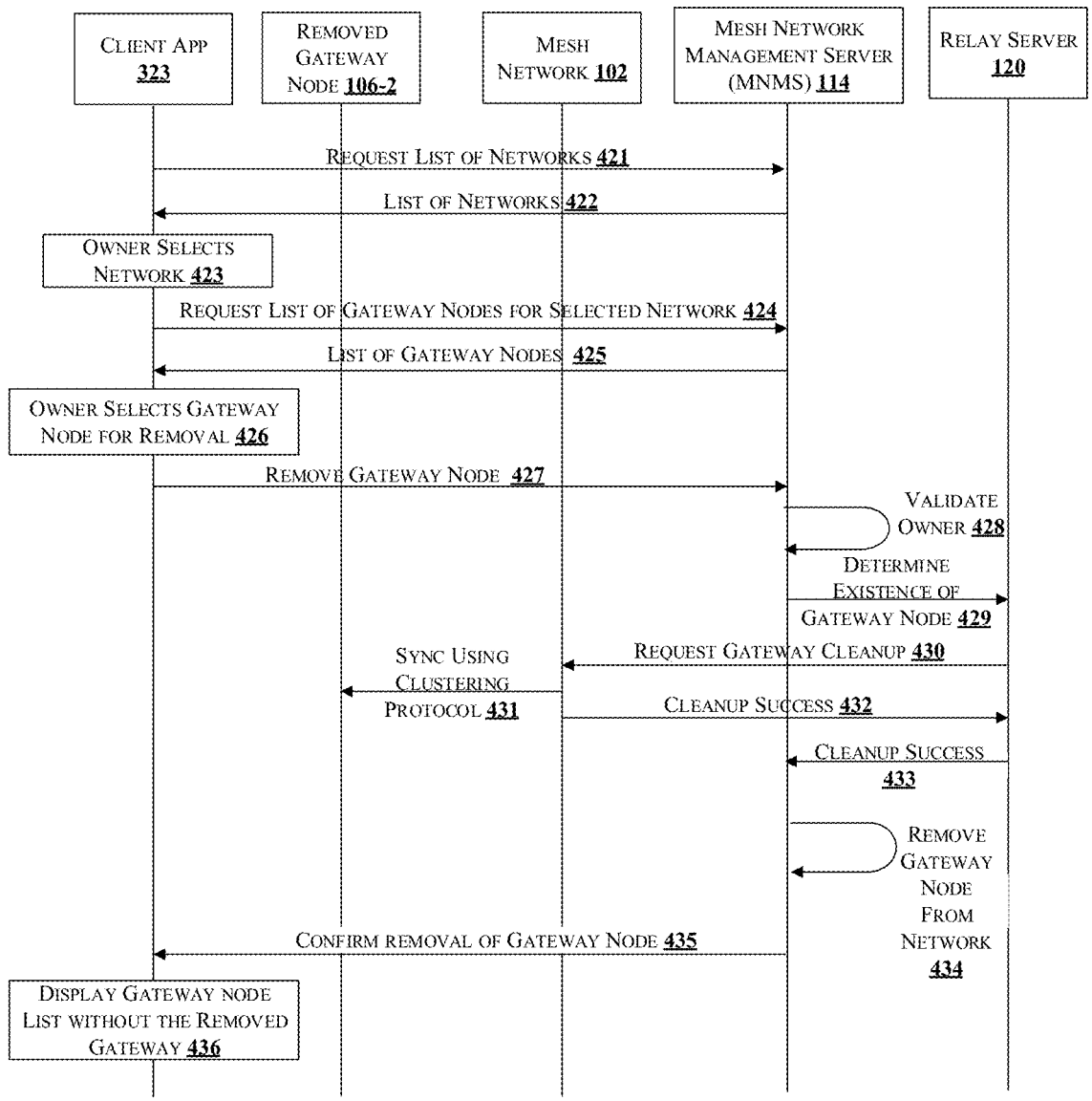
FIG. 4c illustrates an exemplary message sequence for removing gateway node from network in accordance with some embodiments of the present disclosure.

FIG. 4c illustrates an exemplary message sequence for removing gateway node from the mesh network in accordance with some embodiments of the present disclosure.

If a user wishes to remove the gateway nodes 106 from the mesh network 102, then the user may request for the removal via the client application 323. In one embodiment, the client application 323 may request for removal of at least one gateway node from the mesh network 102. In one example, the client application 323 may requests for removal of the gateway node 106-1 from the mesh network 102. Based on the user request, the client application 323 transmits a request for a list of available mesh network 102 accessible by the user at step 421 as illustrated in FIG. 4c. The request may comprise, for example, the app access token 240 of the client application 323. The network management module 293 of the management server 114 validates the permissions of the client application 323 in providing the list of the mesh network 102. On successful verification, the network management module 293 forwards the list of the mesh network 102 to the client application 323 at step 422. The user of the client application 323 may select the mesh network 102 at step 423 and request for a list of gateway nodes 106 of the selected mesh network 102 at step 424. The request comprises at least the network ID and the user access token 241. The network management module 293 of the management server 114 validates the user access token 241 received in the request for providing the list of the gateway nodes 106. On successful verification, the network management module 293 forwards the list of the gateway nodes 106 to the client application 323 at step 425.

On receiving the list of the gateway nodes 106, the user may select the gateway node 106, for example gateway node 106-1, for removal from the mesh network 102. The client application 323 transmits a request for removal of the gateway node 106-1 at step 427. The request includes information comprising the user access token 241, network ID and the unique identifier of the gateway node 106-1 to be removed. The management server 114 validates that that the user is owner of the gateway node 106 for example, gateway node 106-1 being removed and the mesh network 102 from which the gateway node 106-1 is being removed at step 428. The management server 114 also determines existence of the gateway node being removed in the mesh network 102. For example, the management server 114 determines whether the gateway node 106-1 exists as a part of the mesh network 102 at step 429. On successful verification, the management server 114 forwards the request for the gateway node cleanup to the relay server 120 at step 429.

After all the necessary validations and forwarding of requests between the management server 114 and the relay server 120, the relay server 120 sends a request for cleanup to the gateway node 106. In one example, the relay server 120 sends a request for cleanup to the gateway node 106-1 at step 430. The relay server 120 sends the request for gateway cleanup to the network, where the network is the device mesh network that consists of the inter-connected Network Management Node and one or more gateway nodes. The gateway nodes in the network thereafter perform synchronization to remove all network and resource information related to the gateway node being removed and send a SUCCESS message back to the management server 114 to confirm gateway cleanup. In one embodiment, the cleanup request refer to deletion of all stored information associated with the mesh network 102 having network identifier for example network 1. In an example, on receiving a request for gateway cleanup from the relay server 120, the gateway node 106-1 sends a request to the gateway node 106-2 to delete all stored information associated with the mesh network 102 for example network 1, at step 431, thus enabling synchronization of all gateway nodes 106 in the mesh network 102. The gateway node 106-2 deletes the stored information of the network 1 and the gateway node 106-1 deletes all client app proxy nodes and all information associated with the network 1 and notifies the relay server 120 by transmitting a SUCCESS message to the relay server 120 at step 432. Upon being notified of the cleanup success, the relay server 120 notifies the management server 114 about the cleanup SUCCESS at step 433.

The management server 114 removes the gateway node 106 being requested for removal from the mesh network 102 and updates the network data 288. In the illustrated example, the management server 114 removes the gateway node 106-1 and the updates the stored information to remove the gateway node 106-1 from the list of gateway nodes for the network 1 at step 434. The management server 114 confirms the removal of the gateway node 106-1 to the client application 323 at step 425. The client application 323 thereafter updates the list of gateway nodes 106 and displays the list of gateway nodes 106 without the gateway node 106-1 at step 436.

As described in above flows, the gateway nodes 106 of the mesh network 102 synchronizes with each other by sharing the updated information among all the gateway nodes 106 during addition/removal of one of the gateway nodes 106 and during addition/removal of one of the resources 112.

Figure 4D:
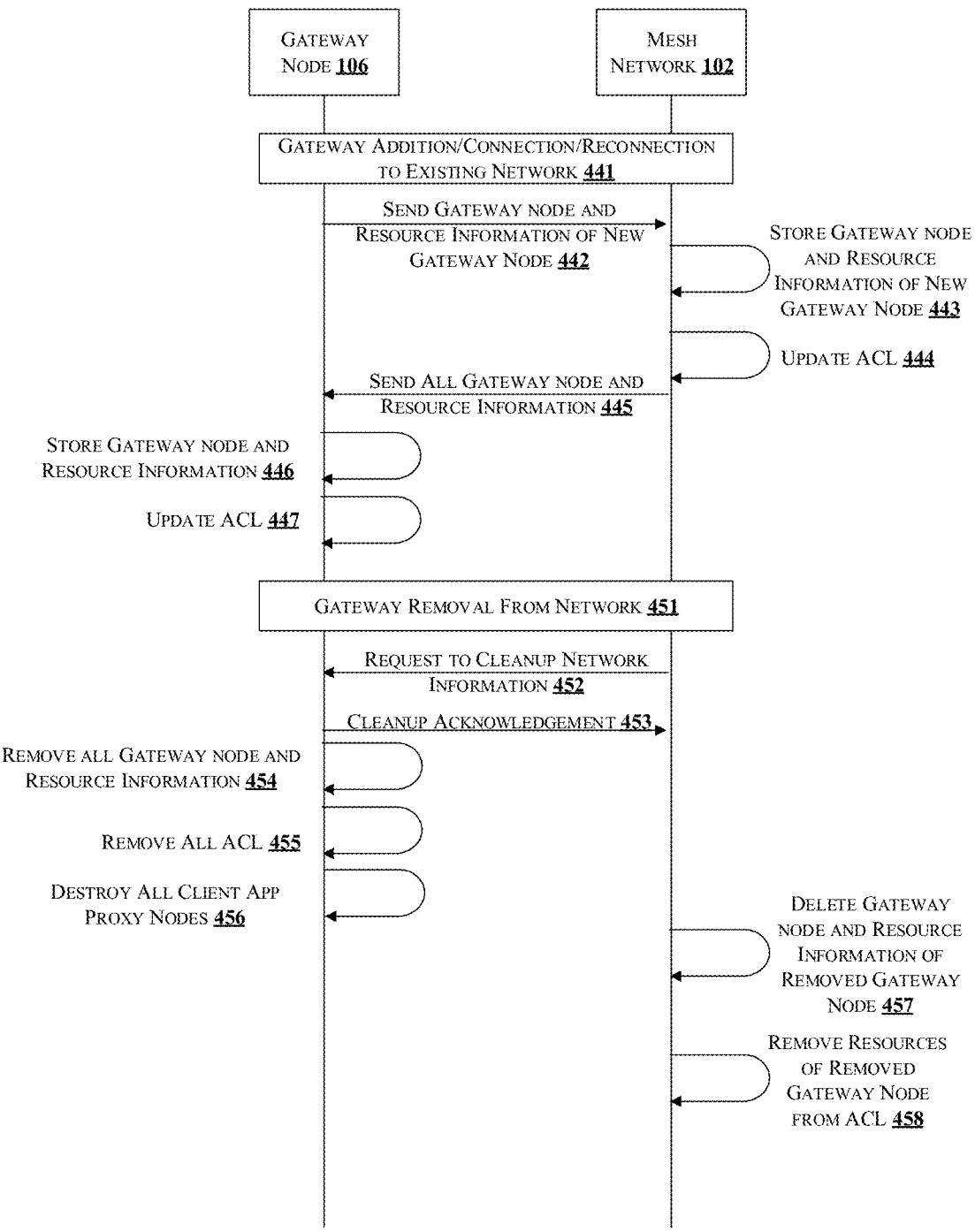
FIG. 4d illustrates an exemplary message sequence of clustering protocol for addition and removal of gateway node to and from network in accordance with some embodiments of the present disclosure.

FIG. 4d illustrates an exemplary message sequence illustrating clustering protocol for synchronizing the mesh network during addition or removal of the gateway node in accordance with some embodiments of the present disclosure. In one embodiment, during addition or connection or reconnection of one of the gateway nodes 106 to existing mesh network 102 (block 441), one of the gateway nodes 106 for example, the gateway node 106-1 added as a new gateway node transmits the shared information associated with the new gateway node 106-1 and the resources 112 associated with the gateway node 106-1 to the mesh network 102 at step 442. The mesh network 102 receives and stores the shared information at step 443 and updates the ACL 238 at step 444. In one example, the gateway nodes 106-2, 106-3 and 106-N receives and stores the shared information at step 443 and updates the ACL 238 at step 444. The gateway nodes 106-2, 106-3 and 106-N further transmits the updated gateway and resource data 289 to the new gateway node 106-1 at step 445. The new gateway node 106-1 receives and stores the shared information at step 446 and updates the ACL 238 at step 447.

In one embodiment, during removal of one of the gateway nodes 106, for example 106-2 from the existing mesh network 102 (block 451), the mesh network 102 transmits a request for gateway cleanup i.e., cleanup of resource data 289 and network data/information 289 associated with the removed gateway node at step 452. The gateway node 106-2 confirms the cleanup of the resource data 289 and network data/information 288 by transmitting a cleanup acknowledgement to the mesh network 102 at step 453. The gateway node 106-2 removes all information associated with the gateway node 106-2 and the resources 112 of the gateway node 106-2 at step 454. The gateway node 106-2 further removes all ACL 238 with the gateway node 106-2 at step 455. Furthermore, the gateway node 106-2 deletes all client app proxy nodes associated with the gateway node 106-2 at step 456. The mesh network 102 i.e., the gateway nodes 106-1, 106-3 and 106-N also removes all information associated with the removed gateway node 106-2 and the resources 112 of the removed gateway node 106-2 at step 457. The gateway nodes 106-1, 106-3 and 106-N further removes the resource data 289 of the gateway node 106-2 from the respective ACL 238 of the gateway nodes 106-1, 106-3 and 106-N at step 458, thus completing the synchronization of network information during addition/removal of one of the gateway nodes 106.

Figure 4E:
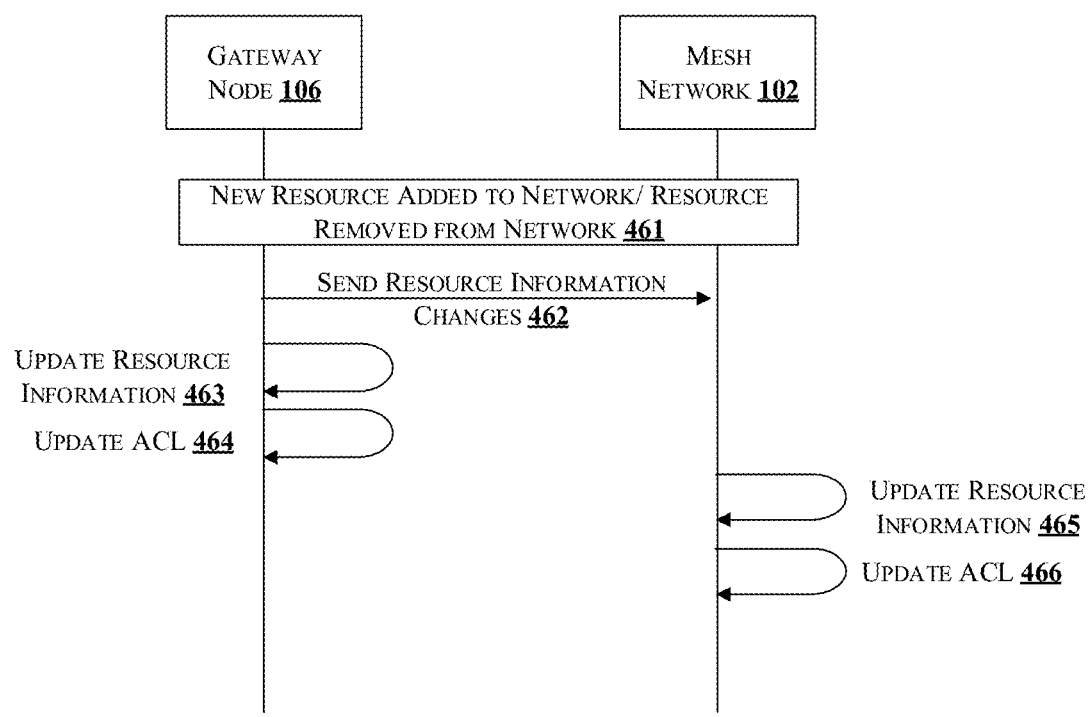
FIG. 4e illustrates an exemplary message sequence of clustering protocol for addition and removal of resource to and from network in accordance with some embodiments of the present disclosure.

The clustering protocol also involves synchronization of the mesh network 102 during addition or removal of one of the resources 112 from the mesh network 102. FIG. 4e shows an exemplary message sequence illustrating clustering protocol for synchronizing the mesh network during addition or removal of the resources from the mesh network 102 (block 461) in accordance with some embodiments of the present disclosure.

In one embodiment, one of the gateway nodes 106 i.e., the gateway node 106-2 adding or removing the resource for example, resource 112-5 from the mesh network 102, transmits resource data 289 changes to the mesh network 102 i.e., the gateway nodes 106-1, 106-3 and 106-N at step 462. Further, the gateway node 106-2 updates the resource data 289 at step 463 and updates the ACL 238 at step 464 associated with the added or removed resource 112-5. The mesh network 102 i.e., the gateway nodes 106-1, 106-3 and 106-N also update the resource data 289 at step 465, and updates the ACL 238 at step 466 associated with the added or removed resource 112-5, thus completing the synchronization of resource data 289 during addition/removal of one of the resources 112.

Figure 5:
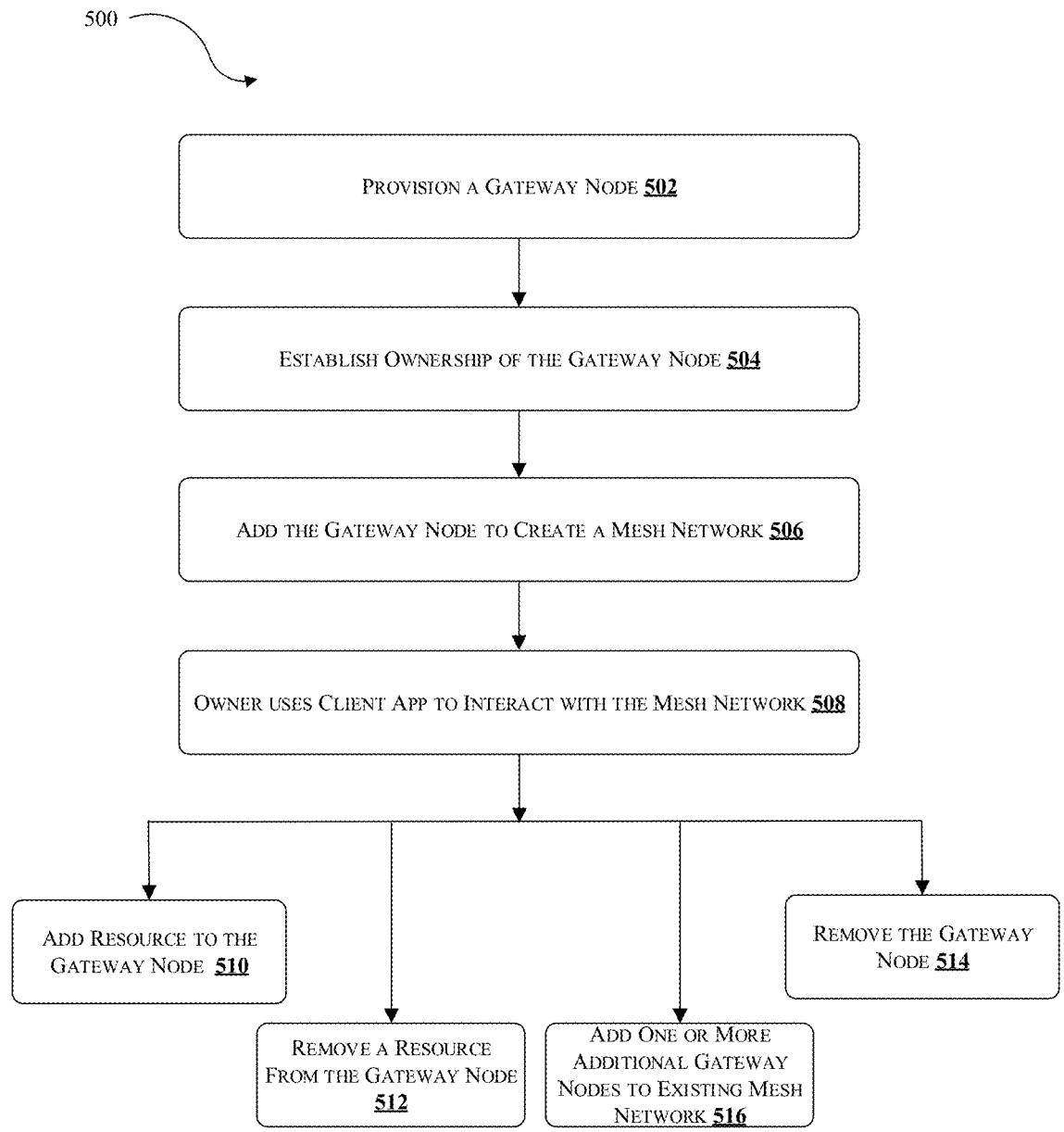
FIG. 5 illustrates an exemplary flowchart illustrating a method of creating and managing a private, decentralized, secure, peer-to-peer IP based mesh overlay network in accordance with some embodiments of the present disclosure.

FIG. 5 illustrates an exemplary flowchart illustrating a method of creating and managing decentralized peer-to-peer network in accordance with some embodiments of the present disclosure.

As illustrated in FIG. 5, the method 500 includes one or more blocks implemented by the management server 114 of the mesh network 102 for creating and managing a decentralized peer-to-peer network. In one embodiment, the one or more blocks of the method 500 is performed by the processor 282 of the management server 114. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method 500. Additionally, individual blocks may be deleted from the method 500 without departing from the scope of the subject matter described herein. Furthermore, the method 500 can be implemented in any suitable hardware, software, firmware, or combination thereof.

In one embodiment, the processor 282 of the management server 114 enables creation of the mesh network 102 by provisioning one of the gateway nodes 106 at block 502. At block 502, one of the gateway nodes 106 is provisioned as explained in relation to FIG. 3*a*. At block 504, the processor 282 enables ownership of the provisioned gateway nodes 106 as explained in relation to FIG. 3*b*. On completion of the provisioning and ownership, the processor 282 adds one of the gateway nodes 106 to either a new or an existing mesh network 102 at block 506 as illustrated in FIGS. 3*c* and 3*d* respectively.

The processor 282 further enables the owner of the gateway nodes 106 to interact with the client application 323 at block 508, to perform one or more of actions including adding or removal of one or more resources 112 at blocks 510 and 512 as best illustrated in FIGS. 4*a* and 4*b* respectively. The processor 282 furthermore enables the owner of the gateway nodes 106 to interact with the client application 323 at block 508 to perform actions like removal of one or more gateway nodes 106 at block 514 as best illustrated in FIG. 4*c* or addition of one or more additional gateway nodes 106 to existing mesh network at block 516 as best illustrated in FIG. 3*d* and further perform synchronization of the mesh network 102 using the clustering protocol as best illustrated in FIGS. 4*d* & 4*e*. Thus, the disclosure enables creation and management of a mobility resilient, self-healing, plug and play network infrastructure for connecting applications, devices and services for IoE.

In one example, an Energy Meter may be one of the gateway nodes and an Energy Utility company may take ownership of the energy meter. During installation of the Energy Meter, the Energy Utility company takes ownership of the Energy Meter and creates a mesh network which contains all of the Energy Meters as Gateway Nodes. The Energy Utility company may invite the homeowner as a user into the network, and the homeowner downloads a client application that works with the Energy Meter and joins the network via the Join Network flow. Thus, the proposed invention provides a seamless plug and play network infrastructure for connecting application, devices and services for IoE.

In another example, there are three Gateway Nodes in the mesh network such as a Zigbee/Z-Wave Router, a Smart Washing Machine and a Smart Bulb. The Router may be moved from one geographical location to another and still be capable of establishing a connection with the Washing Machine and Smart Bulb. Similarly, a client application may run on a user device such as smartphone that may be constantly moving from one location to another, but the smartphone will always be able to establish a connection with one of the gateway Nodes in the network, thus enabling a mobility resilient network infrastructure for connecting application, devices and services for IoE.

In yet another example, there are three gateway Nodes in the mesh network such as a Zigbee/Z-Wave Router, a Smart Washing Machine and a Smart Bulb. The Router may route packets to the Smart Bulb via the Washing Machine, but when the Washing Machine goes offline, the Router and Smart Bulb will attempt to connect directly to each other. Similarly, the client application on a smartphone may initially connect to the Washing Machine to access the network, but when the Washing Machine goes offline, it will reestablish a connection with one of the other two devices, thus enabling a self-healing network infrastructure for connecting application, devices and services for IoE.

Figure 6:
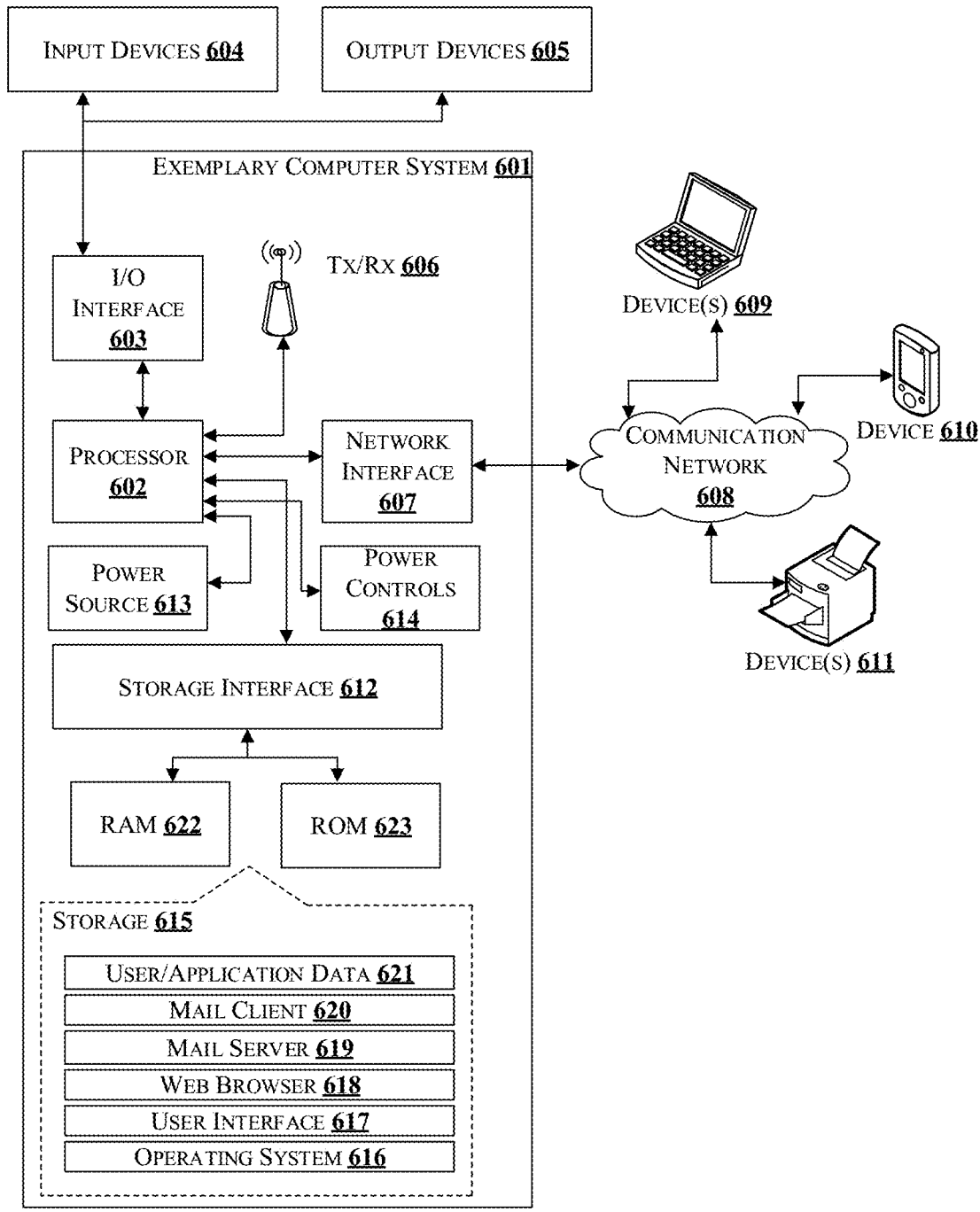
FIG. 6 is a block diagram of an exemplary computer system for implementing embodiments consistent with the present disclosure.

FIG. 6 is a block diagram of an exemplary computer system for implementing embodiments consistent with the present disclosure.

Variations of computer system 601 may be used for implementing all the computing systems that may be utilized to implement the features of the present disclosure. Computer system 601 may comprise a central processing unit ("CPU" or "processor") 602. Processor 602 may comprise at least one data processor for executing program components for executing user- or system-generated requests. The processor may include specialized processing units such as integrated system (bus) controllers, memory management control units, floating point units, graphics processing units, digital signal processing units, etc. The processor 602 may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface 607 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory or storage devices (e.g., RAM 613, ROM 614, etc.) via one or more interfaces. In one embodiment, the processor 602 may be disposed in communication with one or more storage devices via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The storage 615 may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface application 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement the web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

In some embodiments, computer system 601 may also comprise components like power source 622 and power controls 623 to control the resources 112. Examples of power source 622 may include battery and mains power supply and the computer system 601 may utilize either battery or mains power supply for performance. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of creating and managing a decentralized IP-based mesh overlay network of one or more nodes, method comprising:
   receiving, by a mesh network management server, a provisioning request from at least one gateway node;
   provisioning, by the mesh network management server, of license and firmware of the at least one gateway node upon authentication of the mesh network management server and the at least one gateway node;
   receiving, by the mesh network management server, a request for ownership of the at least one gateway node from the at least one gateway node, wherein the ownership request includes a gateway access token of the at least one gateway node and a user access token associated with the client application;
   providing, by the mesh network management server, ownership rights of the at least one gateway node to the user upon validation of the gateway access token and the user access token; and
   creating, by the mesh network management server, the mesh overlay network with the at least one gateway node added to the mesh overlay network upon successful verification of the ownership rights of the at least one gateway node.

2. The method as claimed in claim 1, wherein provisioning of the license and firmware of the at least one gateway node comprises:
   receiving, by the mesh network management server, a request for authentication information of the mesh network management server from the at least one gateway node;
   providing, by the mesh network management server, the authentication information of the mesh network management server to the at least one gateway node;
   receiving, by the mesh network management server, upon successful authentication of the mesh network management server, credential information of the at least one gateway node for authentication of the at least one gateway node, wherein the credential information includes unique identification information of the at least one gateway node;
   authenticating, by the mesh network management server, the at least one gateway node based on validation of the credential information of the at least one gateway node;
   granting the license to the at least one gateway node upon successful validation;
   generating, by the mesh network management server, the gateway access token in response to granting of the license;
   receiving, by the mesh network management server, a request for provisioning of firmware of the at least one gateway node; and
   provisioning, by the mesh network management server, of the firmware of the at least one gateway node upon verifying the firmware provisioning request.

3. The method as claimed in claim 1, wherein providing ownership rights of the at least one gateway node comprises:
   verifying the gateway access token and the user access token received in the ownership request, wherein the user access token is a unique identification assigned to the client application; and
   assigning, upon successful verification, the at least one gateway node to the user of the client application associated with the user access token, providing ownership rights of the at least one gateway node to the user.

4. The method as claimed in claim 1, wherein creating the mesh overlay network comprises:
   receiving, by the mesh network management server, a request for adding the at least one new gateway node to the mesh overlay network, from at least one gateway node, wherein the request for adding comprises at least name of a new mesh overlay network;
   verifying the ownership rights of the at least one gateway node upon receiving the request;
   determining non-existence of the new mesh overlay network with corresponding name;
   generating a network id corresponding to the new mesh overlay network upon successful verification of the ownership rights and determination;
   requesting, a relay server coupled with the mesh network management server, to create a network management (NM) node and to generate a gateway node invite for allowing the at least one gateway node to join the new mesh overlay network;
   transmitting the gateway node invite, received from the relay server, to the at least one gateway node for enabling the at least one gateway node to connect to the relay server using the gateway node invite;
creating the new mesh overlay network with the at least one gateway node added to the new mesh overlay network; and
updating network information of the new mesh overlay network including information of at least one gateway node added to the new mesh overlay network.

5. The method as claimed in claim 1, wherein creating the mesh overlay network comprises:
receiving, by the mesh network management server, a request for adding the at least one gateway node to the mesh overlay network, from the at least one gateway node, wherein the request comprises network id of an existing mesh overlay network;
verifying the ownership rights of the at least one gateway node and the mesh overlay network;
requesting the relay server for an additional gateway node invite for allowing the at least one gateway node to join the existing mesh overlay network, upon successful verification of the ownership rights;
receiving the additional gateway node invite from the relay server, via a network management (NM) node of the relay server, for enabling the at least one gateway node to join the existing mesh overlay network using the additional gateway node invite;
transmitting the additional gateway node invite to the at least one gateway node for allowing the at least one gateway node to join the existing mesh overlay network; and
updating network information of the existing mesh overlay network including list of gateway nodes added to the existing mesh overlay network.

6. The method as claimed in claim 1, wherein creating the mesh overlay network further comprises:
receiving, by the mesh network management server, a request for an invite to connect to the mesh overlay network from the client application of the at least one gateway node, wherein the request comprises at least the network id of the mesh overlay network, app access token and the user access token associated with the client application;
verifying the ownership rights to the mesh overlay network based on the user access token received in the request;
requesting the relay server for creation of a relay node and a client app proxy node invite used for connecting the at least one gateway node with a relay node, wherein the relay node is generated by the relay server in response to receiving the request for client app proxy node invite; and
transmitting the client app proxy node invite, received from the relay server, to the at least one gateway node for creation of a client app proxy node for the at least one gateway node.

7. The method as claimed in claim 6, wherein the client app node connects the client application of the user with the client app proxy node, wherein the client app proxy node connects a client app node with the at least one gateway node in the mesh overlay network, wherein the relay server generates a client app node invite upon receiving a confirmation from the at least one gateway node of successful provisioning of the client app proxy node by the at least one gateway node using the client app proxy node invite, wherein the relay node facilitates tunneling of connection between the client app node and the client app proxy node.

8. The method as claimed in claim 1, further comprising:
receiving a request, for removal of the at least one new gateway node, from the at least one gateway node, wherein the request comprises name of the at least one gateway node to be removed and network id of the mesh overlay network;
verifying the ownership rights of the at least one gateway node and the mesh overlay network;
determining that the at least one gateway node exists as part of the mesh overlay network;
requesting, the relay server coupled with the mesh network management server, for removal of the at least one gateway node from the mesh overlay network based on determination; and
updating network information of the mesh overlay network including information of at least one gateway node removed from the mesh overlay network, upon successful removal of the at least one gateway node, wherein the removal comprises deleting information of the at least one gateway node from all the gateway nodes, deleting all client app proxy nodes from the at least one gateway node removed, and disconnecting the removed gateway node from the mesh overlay network.

9. A method of creating and managing a decentralized IP-based mesh overlay network of one or more nodes, method comprising:
transmitting, by at least one gateway node, a provisioning request to a mesh network management server;
receiving, by the at least one gateway node, a gateway access token and firmware provisioned by the mesh network management server in response to authentication of the mesh network management server and the at least one gateway node;
transmitting, by the at least one gateway node, a request for ownership from a client application of the user of the at least one gateway node to the mesh network management server, wherein the request for ownership includes a gateway access token received from the mesh network management server, and a user access token associated with the client application;
receiving, by the at least one gateway node, confirmation of ownership rights of the at least one gateway node upon verification of the gateway access token and the user access token by the mesh network management server; and
adding, by the at least one gateway node, to one of a new and existing mesh overlay network to create the mesh overlay network based on successful verification of the ownership rights of the at least one gateway node.

10. The method as claimed in claim 9, further comprising:
requesting for a new gateway access token to the mesh network management server, wherein the request comprises at least a gateway refresh token of the at least one gateway node received along with the gateway access token from the mesh network management server; and
receiving the new gateway access token based on validation of the gateway refresh token by the mesh network management server.

11. The method as claimed in claim 9, further comprising:
receiving, by at least one gateway node, a request for addition of one or more resources from the client application, wherein the mesh overlay network is a collection of at least one gateway node and one or more resources coupled with each gateway node, wherein each resource is a capable of providing one or more functions associated with the resource;

adding, by the at least one gateway node, one or more resources to at least one gateway node with each added resource assigned with a unique identifier;

transmitting, by the at least one gateway node, resource information of the at least one resource added to the at least one gateway node to all other gateway nodes of the mesh overlay network, wherein the resource information includes the unique identifier of the at least one added resource; and updating, by at the least one gateway node, Access Control List (ACL) information of the at least one gateway node of the mesh overlay network, wherein the ACL information comprises a list of resources of the mesh overlay network and one or more permissions assigned to manage functions of the one or more resources.

12. The method as claimed in claim 9, further comprising:

receiving, by the at least one gateway node, a request for removal of one or more resources from the client application associated with user of at least one gateway node of the mesh overlay network, wherein the request comprises unique identifier of the one or more resources that are to be removed;

removing, by the at least one gateway node, the one or more resources from the at least one gateway node by disconnecting the one or more resources from the at least one gateway node and deleting the unique identifier, assigned to the one or more removed resources, from the ACL information of the at least one gateway node; and transmitting, by the at least one gateway node, a request for deletion of resource information of the one or more removed resources, to all other gateway nodes of the mesh overlay network, wherein the resource information includes the unique identifier of the one or more removed resources.

13. The method as claimed in claim 9, wherein adding the at least one gateway node to a new mesh overlay network comprises:

sending a request for adding the at least one gateway node to a new mesh overlay network from the client application of user of the at least one gateway node, wherein the request for adding comprises at least name of the mesh overlay network;

receiving a gateway node invite for connecting with a relay server, upon creation of a network management (NM) node by the relay server;

connecting to the relay server using the gateway node invite;

receiving a client app proxy node invite from the relay server for creation of a client app proxy node at the at least one gateway node, wherein the relay server creates a relay node and the client app proxy node invite to enable the owner of the at least one gateway node to use a client application to connect to the mesh overlay; and creating and connecting to the relay server, the client app proxy node using the client app proxy node invite, wherein the client app proxy node connects the client application of the user and the at least one gateway node; and creating an access control list (ACL) for the client app proxy node, wherein the ACL comprises a list of resources of the mesh overlay network and one or more permissions assigned to manage functions of the one or more resources.

14. The method as claimed in claim 9, wherein adding the at least one gateway node to an existing mesh overlay network comprises:

sending a request for adding the at least one gateway node to the existing mesh overlay network from the client application of user of the at least one gateway node, wherein the request for adding comprises at least network id of an existing mesh overlay network;

receiving an additional gateway node invite from the relay server, via a network management (NM) node of the relay server; and connecting to the existing mesh overlay network using the additional gateway node invite received from the relay server.

15. A system for creating and managing a decentralized IP-based mesh overlay network of one or more nodes, system comprising:

a mesh network management server, comprising:

at least a processor, and a memory communicatively coupled to the processor, wherein the memory stores processor-executable instructions, which, on execution, cause the processor to:

receive a provisioning request from at least one gateway node;

provision license and firmware of the at least one gateway node upon authentication of the mesh network management server and the at least one gateway node;

receive a request for ownership of the at least one gateway node from the at least one gateway node, wherein the ownership request includes a gateway access token of the at least one gateway node and a user access token associated with the client application;

provide ownership rights of the at least one gateway node to the user upon validation of the gateway access token and the user access token; and create the mesh overlay network with the at least one gateway node added to the mesh overlay network upon successful verification of the ownership rights of the at least one gateway node.

16. The system as claimed in claim 15, wherein the processor is configured to provision the license and firmware of the at least one gateway node by:

receiving a request for authentication information of the mesh network management server from the at least one gateway node;

providing the authentication information of the mesh network management server to the at least one gateway node;

receiving, upon successful authentication of the mesh network management server, credential information of the at least one gateway node for authentication of the at least one gateway node, wherein the credential information includes unique identification information of the at least one gateway node;

authenticating, the at least one gateway node based on validation of the credential information of the at least one gateway node;

granting the license to the at least one gateway node upon successful validation;

generating the gateway access token in response to granting of the license;

receiving a request for provisioning of firmware of the at least one gateway node; and provisioning the firmware of the at least one gateway node upon verifying the firmware provisioning request.

17. The system as claimed in claim 16, wherein the processor is further configured to:
receive a request for a new gateway access token from the at least one gateway node provisioned by the mesh network management server; and
grant the new gateway access token in response to receiving the request.

18. The system as claimed in claim 15, wherein the processor provides ownership rights to the at least one gateway node by:
verifying the gateway access token and the user access token received in the ownership request, wherein the user access token is a unique identification assigned to the client application; and
assigning, upon successful verification, the ownership rights of the at least one gateway node to the user.

19. The system as claimed in claim 15, wherein the processor creates the mesh overlay network by:
receiving a request for adding the at least one new gateway node to the mesh overlay network, from the at least one gateway node, wherein the request for adding comprises at least name of a new mesh overlay network;
verifying the ownership rights of the at least one gateway node upon receiving the request;
determining non-existence of the new mesh overlay network with corresponding name;
generating a network id corresponding to the new mesh overlay network upon successful verification of the ownership rights and determination;
requesting, a relay server coupled with the mesh network management server, to create a network management (NM) node and to generate a gateway node invite for allowing the at least one gateway node to join the new mesh overlay network;
transmitting the first gateway node invite, received from the relay server, to the at least one gateway node for enabling the at least one gateway node to connect to the relay server using the gateway node invite;
creating the new mesh overlay network with the at least one gateway node added to the new mesh overlay network upon successful connection of the at least one gateway node to the relay server; and
updating network information of the new mesh overlay network including information of at least one gateway node added to the new mesh overlay network.

20. The system as claimed in claim 19, wherein the processor creates the mesh overlay network by:
receiving a request for an invite to connect to the mesh overlay network from the client application of the at least one gateway node, wherein the request comprises at least the network id of the mesh overlay network, the app access token and the user access token associated with the client application;
verifying the ownership rights to the at least one gateway node based on the user access token received in the request;
requesting the relay server for creation of a relay node and a client app proxy node invite used for connecting the at least one gateway node with a relay node, wherein the relay node is generated by the relay server in response to receiving the request for client app proxy node invite; and
transmitting the client app proxy node invite, received from the relay server, to the at least one gateway node for creation of a client app proxy node for the at least one gateway node.

21. The system as claimed in claim 20, wherein the client app node connects the client application of the user with the client app proxy node, wherein the client app proxy node connects a client app node with the at least one gateway node in the mesh overlay network, wherein the relay server generates a client app node invite upon creation of the client app proxy node by the at least one gateway node using the client app proxy node invite, wherein the relay node facilitates tunneling of connection between the client app node and the client app proxy node.

22. The system as claimed in claim 15, wherein the processor creates the mesh overlay network by:
receiving a request for adding the at least one gateway node to the mesh overlay network, from the at least one gateway node, wherein the request comprises network id of an existing mesh overlay network;
verifying the ownership rights of the at least one gateway node and the mesh overlay network;
requesting the relay server for an additional gateway node invite for allowing the at least one gateway node to join the existing mesh overlay network, upon successful verification of the ownership rights;
receiving the additional gateway node invite from the relay server, via a network management (NM) node of the relay server, for enabling the at least one gateway node to join the existing mesh overlay network using the additional gateway node invite;
transmitting the additional gateway node invite to the at least one gateway node for allowing the at least one gateway node to join the existing mesh overlay network and
updating network information of the existing mesh overlay network including list of gateway nodes added to the existing mesh overlay network.

23. The system as claimed in claim 15, wherein the processor is further configured to:
receive a request, for removal of the at least one new gateway node, from the at least one gateway node, wherein the request comprises name of the at least one gateway node to be removed and network id of the mesh overlay network;
verify the ownership rights of the at least one gateway node and the mesh overlay network;
determine that the at least one gateway node exists as part of the mesh overlay network;
request, the relay server coupled with the mesh network management server, for removal of the at least one gateway node from the mesh overlay network based on determination; and
update network information of the mesh overlay network including information of at least one gateway node removed from the mesh overlay network, upon successful removal of the at least one gateway node,
wherein the removal comprises deleting information of the at least one gateway node from all gateway nodes, deleting all client app proxy nodes from the at least one gateway node removed, and disconnecting the removed gateway node from the mesh overlay network.

24. A system for creating and managing a decentralized IP-based mesh overlay network of one or more nodes, system comprising:
at least one gateway node, comprising at least a processor, and a memory communicatively coupled to the processor, wherein the memory stores processor-executable instructions, which, on execution, cause the processor to:

transmit a provisioning request to a mesh network management server;

receive a gateway access token and firmware provisioned by the mesh network management server in response to authentication of the mesh network management server and the at least one gateway node;

transmit a request for ownership from a client application of the user of the at least one gateway node to the mesh network management server, wherein the request for ownership includes a gateway access token received from the mesh network management server, and a user access token associated with the client application;

receive confirmation of ownership rights of the at least one gateway node upon verification of the gateway access token and the user access token by the mesh network management server; and add to one of a new and existing mesh overlay network to create the mesh overlay network based on successful verification of the ownership rights of the at least one gateway node.

25. The system as claimed in claim 24, wherein the processor is further configured to:

request for a new gateway access token to the mesh network management server, wherein the request comprises at least a gateway refresh token of the at least one gateway node received along with the gateway access token from the mesh network management server; and receive the new gateway access token based on validation of the gateway refresh token by the mesh network management server.

26. The system as claimed in claim 24, wherein the processor is further configured to:

receive a request for addition of one or more resources from the client application, wherein the mesh overlay network is a collection of at least one gateway node and one or more resources coupled with each gateway node, wherein each resource is a capable of providing one or more functions associated with the resource;

add one or more resources to at least one gateway node with each added resource assigned with a unique identifier;

transmit resource information of the at least one resource added to the at least one gateway node to all other gateway nodes of the mesh overlay network, wherein the resource information includes the unique identifier of the at least one added resource; and update Access Control List (ACL) information of the at least one gateway node of the mesh overlay network, wherein the ACL information comprises a list of resources of the mesh overlay network and one or more permissions assigned to manage functions of the one or more resources.

27. The system as claimed in claim 24, wherein the processor is further configured to:

receive a request for removal of one or more resources from the client application associated with user of at least one gateway node of the mesh overlay network, wherein the request comprises unique identifier of the one or more resources that are to be removed;

remove the one or more resources from the at least one gateway node by disconnecting the one or more resources from the at least one gateway node and deleting the unique identifier, assigned to the one or more removed resources, from the ACL information of the at least one gateway node; and transmit a request for deletion of resource information of the one or more removed resources, to all other gateway nodes of the mesh overlay network, wherein the resource information includes the unique identifier of the one or more removed resources.

28. The system as claimed in claim 24, wherein the processor enables addition of the at least one gateway node to a new mesh overlay network by:

sending a request for adding the at least one gateway node to the new mesh overlay network from the client application of user of the at least one gateway node, wherein the request for adding comprises at least name of the mesh overlay network;

receiving a gateway node invite for connecting with a relay server, upon creation of a network management (NM) node by the relay server;

connecting to the relay server using the first gateway node invite;

receiving a client app proxy node invite from the relay server for creation of a client app proxy node at the at least one gateway node, wherein the relay server creates a relay node and the client app proxy node invite to enable the at least one gateway node to get added to the mesh overlay network; and creating the client app proxy node using the client app proxy node invite, wherein the client app proxy node connects the client application of the user and the at least one gateway node.

29. The system as claimed in claim 24, wherein the processor enables addition of the at least one gateway node to the existing mesh overlay network by:

sending a request for adding the at least one gateway node to the mesh overlay network from the client application of user of the at least one gateway node, wherein the request for adding comprises at least network id of an existing mesh overlay network;

receiving an additional gateway node invite from the relay server, via a network management (NM) node of the relay server; and connecting to the existing mesh overlay network using the additional gateway node invite received from the relay server.

30. A method of creating and managing a decentralized IP-based mesh overlay network of one or more nodes, method comprising:

receiving, by a relay server, a request for a network management (NM) node for the mesh overlay network from the management server, wherein the request comprises at least network name and network ID of the mesh overlay network;

creating, by the relay server, the NM node and a gateway node invite for the one of the gateway nodes joining the mesh overlay network; and transmitting, by the relay server, the gateway node invite to the management server for creating the mesh network and adding the one of gateway nodes to the mesh network.

31. The method as claimed in claim 30, wherein the NM node manages the functions of the gateway nodes associated with the mesh overlay network, wherein the gateway node invite is an invite used by the one of the gateway nodes to join the mesh overlay network.

32. The method as claimed in claim 30, further comprising:

receiving a request from a client device, connected to the one of the gateway nodes of the mesh network, to access the resources;

determining if the client device require remote connectivity access permission to connect to the resources;
creating a relay node and a client app proxy node invite upon determination that the client device require remote connectivity access permission;
transmitting the client app proxy node invite to one of the gateway nodes for creation of a client app proxy node, wherein the client app proxy node enables the client application to connect with the one of the gateway nodes;
receiving a confirmation message indicating creation of client app proxy node from the one of the gateway nodes;
creating a client app node invite for creation of a client app node, wherein the client app node is an instance of the client application created to act as connecting node between the client application and the client app proxy node; and
transmitting the client app proxy node invite to the client device via the management server for creation of client app node that enables access to the resources by the client device.

33. A system for creating and managing a decentralized IP-based mesh overlay network of one or more nodes, system comprising:
a relay server, comprising:
at least a processor, and a memory communicatively coupled to the processor, wherein the memory stores processor-executable instructions, which, on execution, cause the processor to:
receive a request for a network management (NM) node for the mesh overlay network from the management server, wherein the request comprises at least network name and network ID of the mesh overlay network;
create the NM node and a gateway node invite for the one of the gateway nodes joining the mesh overlay network; and
transmit the gateway node invite to the management server for creating the mesh network and adding the one of gateway nodes to the mesh network.

34. The system as claimed in claim 33, wherein the processor enables the NM node to manage the functions of the gateway nodes associated with the mesh overlay network, wherein the gateway node invite is an invite used by the one of the gateway nodes to join the mesh overlay network.

35. The system as claimed in claim 33, wherein the processor is further configured to:
receiving a request from a client device, connected to the one of the gateway nodes of the mesh network, to access the resources;
determining if the client device require remote connectivity access permission to connect to the resources;
creating a relay node and a client app proxy node invite upon determination that the client device require remote connectivity access permission;
transmitting the client app proxy node invite to one of the gateway nodes for creation of a client app proxy node, wherein the client app proxy node enables the client application to connect with the one of the gateway nodes;
receiving a confirmation message indicating creation of client app proxy node from the one of the gateway nodes;
creating a client app node invite for creation of a client app node, wherein the client app node is an instance of the client application created to act as connecting node between the client application and the client app proxy node; and
transmitting the client app proxy node invite to the client device via the management server for creation of client app node that enables access to the resources by the client device.

36. A method of enabling synchronization of one or more gateway nodes in a mesh overlay network, method comprising:
detecting, by the mesh overlay network, at least one of events including addition/connection/reconnection of a new gateway node to the mesh overlay network, removal of one of the gateway nodes from the mesh overlay network and addition/removal of one or more resources connected to one of the gateway nodes in the mesh overlay network; and
updating, by the mesh overlay network, one or more of network data and resource data based on at least one event detected, wherein the network data is associated with the one or more gateway nodes of the mesh overlay network, and the resource data is associated with the one or more resources connected to the one or more gateway nodes in the mesh overlay network.

37. The method as claimed in claim 36, wherein the network data comprises network name, network ID, gateway ID assigned to the gateway nodes and Access Control List (ACL) information, wherein the ACL comprises a list of resources of the mesh overlay network and one or more permissions assigned to manage functions of the one or more resources.

38. The method as claimed in claim 36, wherein the resource data comprises list of resources, user access list and capabilities of each of the resources as per the user access list.

39. The method as claimed in claim 36, wherein updating one or more of network data and resource data if the at least one detected event is addition/connection/reconnection of the new gateway node to the mesh overlay network comprises:
receiving and storing the network data of the new gateway node and resource data of the one or more resources connected to the new gateway node;
updating the ACL of the one or more gateway nodes of the mesh overlay network; and
transmitting the network data and the resource data of all the gateway nodes of the mesh overlay network to the new gateway node for updation of network data, resource data and ACL of the new gateway node.

40. The method as claimed in claim 36, wherein updating one or more of network data and resource data if the at least one detected event is removal of one of the gateway nodes from the mesh overlay network comprises:
transmitting a request for gateway cleanup to one of the gateway nodes to be removed from the mesh overlay network;
receiving a cleanup acknowledgement from the one of the gateway nodes to be removed upon deletion of network data, resource data, ACL, all client app proxy nodes stored at the one of the gateway nodes to be removed; and
deleting the network data, resource data and one or more resources connected to the removed gateway node from the ACL of each gateway node in the mesh network.

41. The method as claimed in claim 36, wherein updating one or more of network data and resource data if the at least one detected event is addition/removal of one or more resources connected to one of the gateway nodes in the mesh overlay network comprises:
   receiving updated resource data from one of the gateway nodes;
   enabling update of resource data and ACL at the one of the gateway nodes; and
   updating resource data and ACL of each of the gateway nodes in the mesh overlay network.

* * * * *